(12) United States Patent
Rahmes et al.

(10) Patent No.: US 12,265,882 B2
(45) Date of Patent: Apr. 1, 2025

(54) SYSTEMS AND METHODS FOR QUANTUM COMPUTING BASED SUBSET SUMMING

(71) Applicant: Eagle Technology, LLC, Melbourne, FL (US)

(72) Inventors: Mark D. Rahmes, Melbourne, FL (US); Thomas J. Billhartz, Melbourne, FL (US); Rachele Cocks, Colombia City, IN (US)

(73) Assignee: Eagle Technology, LLC, Melbourne, FL (US)

( * ) Notice: Subject to any disclaimer, the term of this patent is extended or adjusted under 35 U.S.C. 154(b) by 1056 days.

(21) Appl. No.: 17/200,388

(22) Filed: Mar. 12, 2021

(65) Prior Publication Data
US 2022/0300843 A1    Sep. 22, 2022

(51) Int. Cl.
| | | |
|---|---|---|
| G06N 10/00 | (2022.01) | |
| G06F 15/82 | (2006.01) | |
| G06N 3/044 | (2023.01) | |
| G06N 3/045 | (2023.01) | |
| G06N 3/08 | (2023.01) | |

(Continued)

(52) U.S. Cl.
CPC ............. *G06N 10/00* (2019.01); *G06F 15/82* (2013.01); *G06N 7/01* (2023.01); *G06N 3/044* (2023.01); *G06N 3/045* (2023.01); *G06N 3/08* (2013.01); *G06N 10/20* (2022.01)

(58) Field of Classification Search
CPC .......... G06N 10/00; G06N 7/01; G06N 3/044; G06N 3/045; G06N 3/08; G06N 10/20; G06F 15/82
See application file for complete search history.

(56) References Cited

U.S. PATENT DOCUMENTS

| | | |
|---|---|---|
| 6,518,018 B1 | 2/2003 | Szostak et al. |
| 7,069,282 B2 | 6/2006 | Rizzotto et al. |
| 7,203,715 B2 | 4/2007 | Rizzotto et al. |

(Continued)

OTHER PUBLICATIONS

Ramezani et al., ("Machine Learning Algorithms in Quantum Computing: A Survey " Published 2020 -total 8 pages IEEE (Year: 2020).*

(Continued)

*Primary Examiner* — Quoc A Tran
(74) *Attorney, Agent, or Firm* — Fox Rothschild LLP; Carol E. Thorstad-Forsyth

(57) ABSTRACT

Systems and methods for operating a quantum processor. The methods comprise: receiving a reward matrix at the quantum processor, the reward matrix comprising a plurality of values that are in a given format and arranged in a plurality of rows and a plurality of columns; converting, by the quantum processor, the given format of the plurality of values to a qubit format; performing, by the quantum processor, subset summing operations to make a plurality of row selections based on different combinations of the values in the qubit format; using, by the quantum processor, the plurality of row selections to determine a normalized quantum probability for a selection of each row of the plurality of rows; making, by the quantum processor, a decision based on the normalized quantum probabilities; and causing, by the quantum processor, operations of an electronic device to be controlled or changed based on the decision.

20 Claims, 18 Drawing Sheets

(51) Int. Cl.
*G06N 7/01* (2023.01)
*G06N 10/20* (2022.01)

(56) References Cited

U.S. PATENT DOCUMENTS

| | | | |
|---|---|---|---|
| 7,334,008 | B2 | 2/2008 | Branciforte et al. |
| 7,359,928 | B2 | 4/2008 | Porto et al. |
| 7,400,282 | B2 | 7/2008 | Tanaka et al. |
| 8,077,988 | B2 | 12/2011 | Donoho |
| 8,583,903 | B2 | 11/2013 | Freedman et al. |
| 9,047,571 | B2 | 6/2015 | Miller et al. |
| 10,176,433 | B2 | 1/2019 | Hastings et al. |
| 10,423,887 | B2 | 9/2019 | Roetteler et al. |
| 10,505,524 | B1 | 12/2019 | Cohen et al. |
| 10,592,216 | B1 | 3/2020 | Richardson et al. |
| 10,664,761 | B2 | 5/2020 | Haener et al. |
| 10,666,238 | B1 | 5/2020 | Cohen et al. |
| 10,713,582 | B2 | 7/2020 | Dadashikelayeh |
| 2003/0149511 | A1 | 8/2003 | Rizzotto et al. |
| 2004/0059765 | A1 | 3/2004 | Rizzotto et al. |
| 2004/0130956 | A1 | 7/2004 | Porto et al. |
| 2004/0162640 | A1 | 8/2004 | Branciforte et al. |
| 2004/0179622 | A1 | 9/2004 | Calabro et al. |
| 2006/0224547 | A1 | 10/2006 | Ulyanov et al. |
| 2007/0120727 | A1 | 5/2007 | Tanaka et al. |
| 2008/0140746 | A1 | 6/2008 | Papageorgiou et al. |
| 2008/0140749 | A1 | 6/2008 | Amato et al. |
| 2011/0161638 | A1 | 6/2011 | Freedman et al. |
| 2014/0192388 | A1 | 7/2014 | Miller et al. |
| 2015/0006443 | A1* | 1/2015 | Rose .................. G06N 20/00 706/12 |
| 2016/0202195 | A1 | 7/2016 | Wittwer et al. |
| 2017/0147695 | A1 | 5/2017 | Shih |
| 2017/0330101 | A1 | 11/2017 | Hastings et al. |
| 2018/0038973 | A1 | 2/2018 | Ascough et al. |
| 2018/0038975 | A1 | 2/2018 | Rahmes et al. |
| 2018/0144262 | A1 | 5/2018 | Roetteler et al. |
| 2019/0340532 | A1 | 11/2019 | Ducore et al. |
| 2019/0361675 | A1 | 11/2019 | Haener et al. |
| 2019/0362270 | A1 | 11/2019 | Haener et al. |
| 2020/0097859 | A1 | 3/2020 | Hu et al. |
| 2020/0125402 | A1 | 4/2020 | Griffin et al. |
| 2020/0134107 | A1 | 4/2020 | Low et al. |
| 2020/0169317 | A1 | 5/2020 | Rahmes et al. |
| 2020/0169458 | A1 | 5/2020 | Rahmes et al. |
| 2020/0198138 | A1 | 6/2020 | Nagayama et al. |
| 2020/0202247 | A1 | 6/2020 | Hu et al. |
| 2020/0202249 | A1 | 6/2020 | Hastings |
| 2020/0218518 | A1 | 7/2020 | Gambetta et al. |

OTHER PUBLICATIONS

Abualsaud, K., Mahmuddin, M., Hussein, R., & Mohamed, A. (Jul. 2013). Performance evaluation for compression- accuracy trade-off using compressive sensing for EEG-based epileptic seizure detection in wireless tele-monitoring. In 2013 9th International Wireless Communications and Mobile Computing Conference (IWCMC) (pp. 231-236). IEEE.
Baraniuk, R. G., Goldstein, T., Sankaranarayanan, A. C., Studer, C., Veeraraghavan, A., & Wakin, M. B. (2017). Compressive video sensing: algorithms, architectures, and applications. IEEE Signal Processing Magazine, 34(1), 52-66.
Hanif, M. S., & Bilal, M. (2019). Competitive residual neural network for image classification. ICT Express.
He, K., Zhang, X., Ren, S., & Sun, J. (2016). Deep residual learning for image recognition. In Proceedings of the IEEE conference on computer vision and pattern recognition (pp. 770-778).
Kingma, D. P., & Ba, J. (2014). Adam: A method for stochastic optimization. arXiv preprint arXiv:1412.6980.
Krizhevsky, A., Sutskever, I., & Hinton, G. E. (2012). Imagenet classification with deep convolutional neural networks. In Advances in neural information processing systems (pp. 1097-1105).
Nawaz, T., Marcenaro, L., & Regazzoni, C. S. (2017). Cyclostationary-based jammer detection for wideband radios using compressed sensing and artificial neural network. International Journal of Distributed Sensor Networks, 13(12), 1550147717748900.
Oquab, M., Bottou, L., Laptev, I., & Sivic, J. (2014). Learning and transferring mid-level image representations using convolutional neural networks. In Proceedings of the IEEE conference on computer vision and pattern recognition (pp. 1717-1724).
O'Shea, T. J., Roy, T., & Clancy, T. C. (2018). Over-the-air deep learning-based radio signal classification. IEEE Journal of Selected Topics in Signal Processing, 12(1), 168-179.
Pandian, R., Vigneswara, T., & Kumari, S. L. (2016). Effects of Decomposition Levels of Wavelets in Image Compression Algorithms. Journal of Biomedical Sciences, 5(4), 29.
Ronneberger, O., Fischer, P., & Brox, T. (Oct. 2015). U-net: Convolutional networks for biomedical image segmentation. In International Conference on Medical image computing and computer-assisted intervention (pp. 234-241). Springer, Cham.
Rajendran, S., Meert, W., Giustiniano, D., Lenders, V., & Pollin, S. (2018). Deep learning models for wireless signal classification with distributed low-cost spectrum sensors. IEEE Transactions on Cognitive Communications and Networking, 4(3), 433-445.
Ramjee, S., Ju, S., Yang, D., Liu, X., Gamal, A. E., & Eldar, Y. C. (2019). Fast deep learning for automatic modulation classification. arXiv preprint arXiv:1901.05850.
Schilling, A., Matzner, C., Rietsch, J., Gerum, R., Schulze, H., & Krauss, P. (2018). How deep is deep enough ?—Quantifying class separability in the hidden layers of deep neural networks. arXiv preprint arXiv:1811.01753.
Sejdic, E., Orovic, I., & Stankovic, S. (2018). Compressive sensing meets time-frequency: an overview of recent advances in time-frequency processing of sparse signals. Digital signal processing, 77, 22-35.
Sharma, D. K., Mishra, A., & Saxena, R. (2010). Analog & Digital Modulation Techniques: An overview. International Journal of Computing Science and Communication Technologies, 3(1), 2007.
Sharma, S. K., Lagunas, E., Chatzinotas, S., & Ottersten, B. (2016). Application of compressive sensing in cognitive radio communications: A survey. IEEE communications surveys & tutorials, 18(3), 1838-1860.
Simonyan, K., & Zisserman, A. (2014). Very deep convolutional networks for large-scale image recognition. arXiv preprint arXiv:1409.1556.
Talukder, K. H., & Harada, K. (2010). Haar wavelet-based approach for image compression and quality assessment of compressed image. arXiv preprint arXiv:1010.4084.
Tembine, H. (2019). Deep learning meets game theory: Bregman-based algorithms for interactive deep generative adversarial networks. IEEE transactions on cybernetics.
Wang, S., Sun, Z., Liu, S., Chen, X., & Wang, W. (Oct. 2014). Modulation classification of linear digital signals based on compressive sensing using high-order moments. In 2014 European Modelling Symposium (pp. 145-150). IEEE.
Junyi Liu, Bohua Zhan, Shuling Wang. Shenggang Ying, Tao Liu, Yangjia Li, Mingsheng Ying, Naijun Zhan. International Conference on Computer Aided Verification. Formal Verification of Quantum Algorithms Using Quantum Hoare Logic.
Zhou, L., & Man, H. (Nov. 2013). Distributed automatic modulation classification based on cyclic feature via compressive sensing. In MILCOM 2013-2013 IEEE Military Communications Conference (pp. 40-45). IEEE.
Ali, S. Coming to a Battlefield Near You: Quantum Computing, Artificial Intelligence, & Machine Learning's Impact on Proportionality.
Berendsen, R. G. (2019). The Weaponization of Quantum Mechanics: Quantum Technology in Future Warfare. US Army School of Advanced Military Studies Fort Leavenworth United States.
Cariolaro, Gianfranco, Quantum Communications, (2015), Springer International Publishing.
Cuccaro, S. A., Draper, T. G., Kutin, S. A., & Moulton, D. P. (2004). A new quantum ripple-carry addition circuit. arXiv preprint quant-ph/0410184.

(56) References Cited

OTHER PUBLICATIONS

Farhi, E., & Harrow, A. W. (2016). Quantum supremacy through the quantum approximate optimization algorithm. arXiv preprint arXiv:1602.07674.
Flitney, A. P., & Abbott, D. (2002). An introduction to quantum game theory. Fluctuation and Noise Letters, 2(04), R175-R187.
Hilary, Jack D., (2019) Quantum Computing: An Applied Approach, Springer Nature Switzerland AG.
Iqbal, A., & Toor, A. H. Quantum mechanics gives stability to a Nash equilibrium. Physical Review A Phys Rev A, 65, 022306.
Jordan, J. D. (2007). Updating Optimal Decisions Using Game Theory and Exploring Risk Behavior Through Response Surface Methodology.
Kalogeras, D. (2013). The quantum theory in decision making. Journal of Computations y Modelling, 3(4), 61-81.
Koiliaris, K., & Xu, C. (2019). Faster pseudopolynomial time algorithms for subset sum. ACM Transactions on Algorithms (TALG), 15(3), 1-20.
Iffiton, M. H., & Sakallah, K. A. (2008). Algorithms for computing minimal unsatisfiable subsets of constraints. Journal of Automated Reasoning, 40(1), 1-33.
Moll, N., Barkoutsos, P., Bishop, L. S., Chow, J. M., Cross, A., Egger, D. J., . . . & Kandala, A. (2018). Quantum optimization using variational algorithms on near-term quantum devices. Quantum Science and Technology, 3(3), 030503.
Oliveira, D. S., & Ramos, R. V. (2007). Quantum bit string comparator: circuits and applications. Quantum Comput. Comput, 7(1), 17-26.
Pac, A. B. (2010). Row generation techniques for approximate solution of linear programming problems (Doctoral dissertation, bilkent university).
Preskill, John, Quantum Computing in the NISQ era and beyond, 2018, California Institute of Technology.
Rahmes, M., Wilder, K., Yates, H., & Fox, K. (2013). Near real time discovery and conversion of open source Information to a reward matrix. WMSCI 2013, 12.
Ruffinelli, D., & Baran, B. (2017). Linear nearest neighbor optimization in quantum circuits: a multiobjective perspective. Quantum Information Processing, 16(9), 220.
Takahashi, Y., Tani, S., & Kunihiro, N. (2009). Quantum addition circuits and unbounded fan-out. arXiv preprint arXiv:0910.2530.
Ulyanov, S. V., Litvintseva, L. V., Ulyanov, S. S., Takahashi, K., & Panfilov, A. L. (2004). Computational intelligence with quantum game's approach and robust decision-making in communication information uncertainty. In Proceedings of Internat. Conf. on Computational Intelligence (pp. 172-187).
Wayne, L. (2004). Winston (2004). Operations Research, Applications and Algorithms. Duxbury Press.
Wendin, G. (2017). Quantum information processing with superconducting circuits: a review. Reports on Progress in Physics, 80(10), 106001.
Wolff, M., Wirsching, G., Huber, M., Graben, P. B., Romer, R., & Schmitt, I. (2018). A Fock Space Toolbox and Some Applications in Computational Cognition. Unpublished. Retrieved from http://rgdoi.net/10.13140/RG.2.2.10025.70245.
Yukalov, V. I., & Somnette, D. (2009). Processing information in quantum decision theory. Entropy, 11(4), 1073-1120.
Robert Rand, Jennifer Paykin, Steve Zdancewic. 14th International Conference on Quantum Physics and Logic (QPL). 2018. QWIRE Practice: Formal Verification of Quantum Circuits in Coq.
Robert Rand, Kesha Hietala, and Kartik Singhal. POPL 2020. Verified Quantum Computing.
Roch C, Phan T, Feld S, et al. A Quantum Annealing Algorithm for Finding Pure Nash Equilibria in Graphical Games. Computational Science—ICCS 2020. 2020;12142:488-501. Published May 25, 2020.
Piotrowski, Edward & Sladkowski, Jan. (2003). The next stage: quantum game theory.
Chiu Fan Lee and Neil F. Johnson (2002) "Let the Quantum Games Begin" Centre for Quantum Computation, Clarendon Laboratory, Oxford University Oct. 2, 2002.
E Farhi, J Goldstone, S Gutmann, A quantum approximate optimization algorithm (QAOA), arXiv preprint arXiv:1411.4028, 2014—arxiv.org.
Rahmes, Billhartz, Chester, Lau (2020) "Optimal Deep Learning Signal Classification with Wavelet Compressive Sensing" Interservice/ Industry Training, Simulation, and Education Conference (I/ITSEC), Aug. 24, 2020.
Rahmes, Billhartz, Cocks (2020) "A Quantum Computing Algorithm for Subset Summing Optimization" Interservice/ Industry Training, Simulation, and Education Conference (I/ITSEC), Sep. 24, 2020.
https://www.cei.se/quantum-computing-and-qc-assisted-communications.
M. Rahmes, R. Clouse, J. Virts, G. Yakimovicz, B. Rees and W. Talbert, "Cognitive mission planning and system orchestration," 2017 International Conference on Computing, Networking and Communications (ICNC), 2017, pp. 745-749.
Daniel Evans (2018) "Dissecting a Quantum Program", Seidenberg School of CSIS, Pace University, Pleasantville, New York, Proceedings of Student-Faculty Research Day, CSIS, Pace University, May 4, 2018.

\* cited by examiner

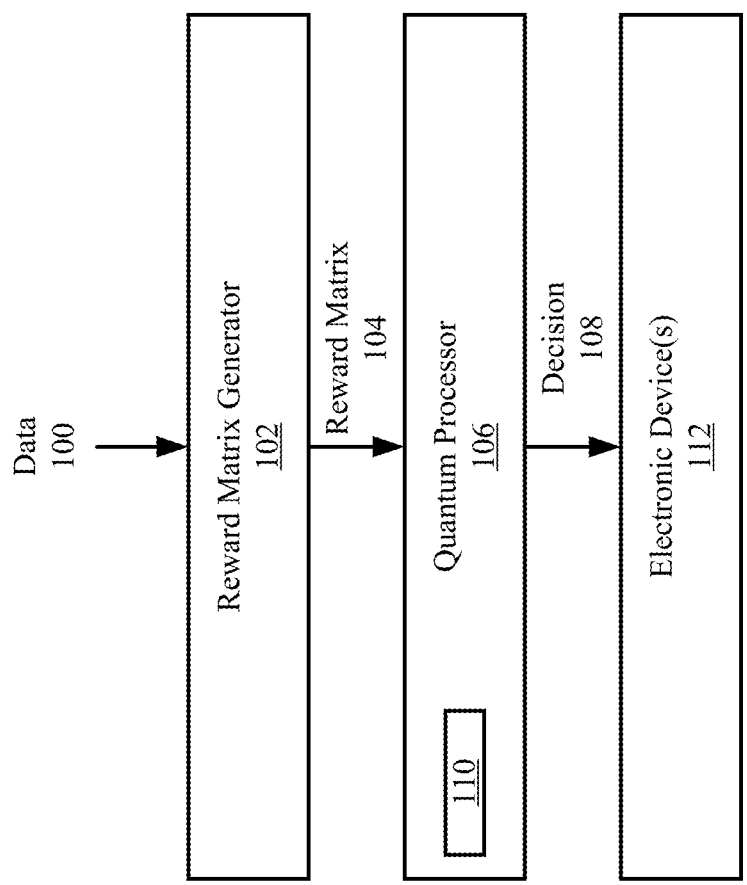

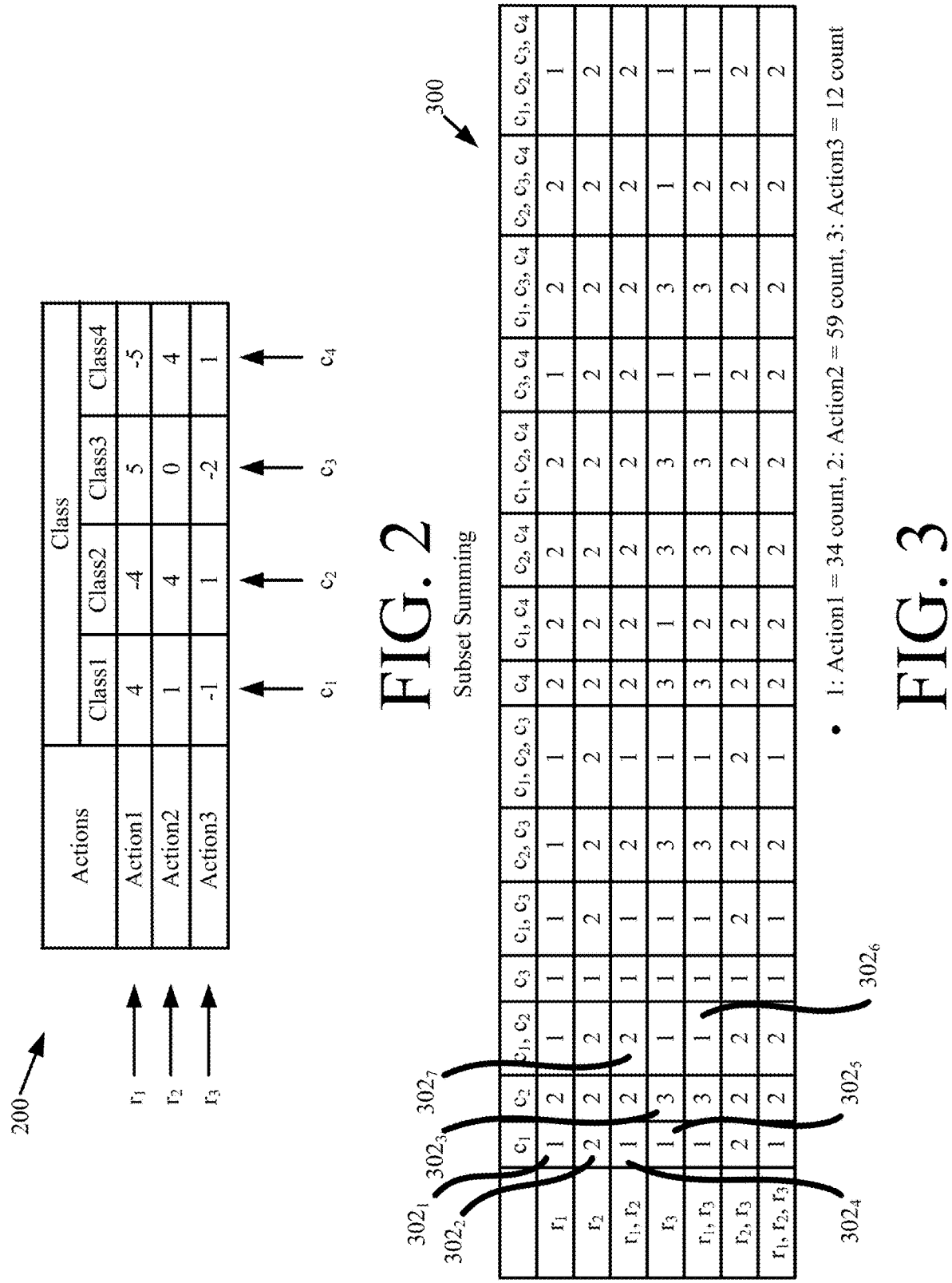

SYSTEMS AND METHODS FOR QUANTUM COMPUTING BASED SUBSET SUMMING

BACKGROUND

Statement of the Technical Field

The present disclosure relates generally to quantum computing systems and associated algorithms. More particularly, the present disclosure relates to implementing systems and methods for quantum computing based subset summing for decision making.

Description of the Related Art

Quantum computers exists today that use the properties of quantum physics to store data and perform computations. Quantum computers comprise specialized hardware on which qubits are stored, controlled and/or manipulated in accordance with a given application. The term "qubit" is used in the field to refer to a unit of quantum information. The unit of information can also be called a quantum state. A single qubit is generally represented by a vector $a|0\rangle + b|1\rangle$, where a and b are complex coefficients and $|0\rangle$ and $|1\rangle$ are the basis vectors for the two-dimensional complex vector space of single qubits. At least partially due to the qubit structure, quantum computers use the properties of quantum physics to perform computation, enabling advantages that can be applied to certain problems that are impractical for conventional computing devices.

SUMMARY

The present disclosure concerns implementing systems and methods for operating a quantum processor. The methods comprise: receiving a reward matrix at the quantum processor, the reward matrix comprising a plurality of values that are in a given format (e.g., a bit format) and arranged in a plurality of rows and a plurality of columns; converting, by the quantum processor, the given format of the plurality of values to a qubit format; performing, by the quantum processor, subset summing operations to make a plurality of row selections based on different combinations of the values in the qubit format; using, by the quantum processor, the plurality of row selections to determine a normalized quantum probability for a selection of each row of the plurality of rows; making, by the quantum processor, a decision based on the normalized quantum probabilities; and causing, by the quantum processor, operations of an electronic device to be controlled or changed based on the decision.

For example, the quantum processor causes the electronic device to transition operational states (e.g., from an off state to an on state, or vice versa), change position (e.g., change a field of view or change an antenna pointing direction), change location, change a navigation parameter (e.g., change a speed or direction of travel), perform a particular task (e.g., schedule an event), change a resource allocation, use a particular machine learning algorithm to optimize wireless communications, and/or use a particular object classification scheme or trajectory generation scheme to optimize autonomous driving operations (e.g., accelerate, decelerate, stop, turn, perform an emergency action, perform a caution action, etc.).

Each row of the reward matrix has a respective choice (or decision) associated therewith. The respective choice (or decision) can include, but is not limited to, a respective action of a plurality of actions, a respective task of a plurality of tasks, a respective direction of a plurality of directions, a respective plan of a plurality of plans, a respective grid of a plurality of grids, a respective position of a plurality of positions, a respective acoustic ray trace of a plurality of acoustic ray traces, a respective tag of a plurality of tags, a respective path of a plurality of paths, a respective machine learning algorithm of a plurality of machine learning algorithms, a respective network node of a plurality of network nodes, a respective person of a group, a respective emotion of a plurality of emotions, a respective personality of a plurality of personalities, a respective business opportunity of a plurality of business opportunities, and/or a respective vehicle of a plurality of vehicles.

The subset summing operations for decision making can be implemented by a plurality of quantum adder circuits and a plurality of quantum comparator circuits. The subset summing operations may comprise an operation in which a single value of the reward matrix is considered and which results in a selection of the row of the reward matrix in which the signal value resides.

Additionally or alternatively, the subset summing operations comprises: an operation in which at least two values of the reward matrix are considered and which results in a selection of the row of the reward matrix in which a largest value of the at least two values resides; an operation in which a single negative value of the reward matrix is considered and which results in a selection of the row of the reward matrix which is different than the row of the reward matrix in which the single negative value resides; an operation in which a plurality of values in at least two columns and at least two rows are considered, and which results in a selection of the row of the reward matrix associated with a largest value of the plurality of values in at least two columns and at least two rows; and/or an operation in which a plurality of values in at least two columns and at least two rows are considered, and which results in a selection of the row of the reward matrix associated with a largest sum of values in the at least two columns.

The implementing systems comprise a quantum processor, a circuit (e.g., quantum registers, quantum adder circuits, and/or quantum comparator circuits), and/or a non-transitory computer-readable storage medium comprising programming instructions that are configured to cause the quantum processor to implement a method for operating the same.

BRIEF DESCRIPTION OF THE DRAWINGS

The present solution will be described with reference to the following drawing figures, in which like numerals represent like items throughout the figures.

FIG. 1 provides an illustration of an illustrative system implementing the present solution.

FIG. 2 provides an illustration of an illustrative reward matrix.

FIG. 3 provides a table that is useful for understanding subset summing operations of a quantum processor.

DETAILED DESCRIPTION

Figure 4:
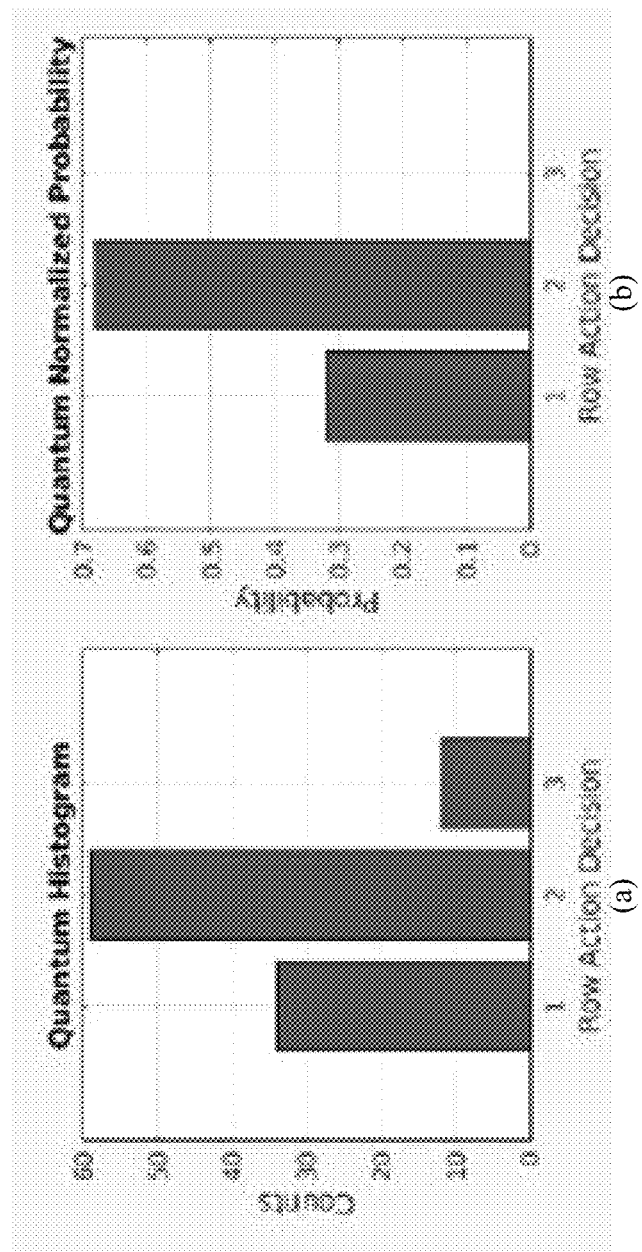
FIG. 4 provides graphs for a quantum histogram and quantum normalized probabilities.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning, the likeliness of, and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As noted above, quantum computers exist today that use the properties of quantum physics to store data and perform computations. Quantum computers comprise specialized hardware on which qubits are stored, controlled and/or manipulated in accordance with a given application. Quantum computers process certain problems faster as compared to conventional computing devices due to their use of qubits to represent multiple problem states in parallel. However, there is no quantum equivalent approach to the classical computing approaches to automated decision-making for strategic scenarios. These classical computing approaches are limited by memory, time and processing constraints. Thus, a novel quantum approach to automated decision-making for strategic scenarios has been derived which provides accurate decisions in a faster amount of time as compared to the classical computing approaches for certain complex problems.

Accordingly, the present solution generally concerns system and methods for quantum computing based decision making. The systems and methods employ a novel quantum algorithm for optimized game theory analysis. The novel quantum algorithm implements a game theory analysis using a reward matrix and subset summing to make decisions in a relatively efficient and fast manner. The subset summing may be implemented using quantum adder circuits and quantum comparison circuits.

Conventionally, decision making based on a reward matrix has been achieved using linear programming in classical computers using binary bits. Linear programming is a fundamentally different and relatively slow approach as compared to the present quantum computing based approach. Linear programming cannot be implemented in quantum computing devices. As such, an alternative subset summing technique has been derived which can be implemented in quantum computing devices for solving reward matrices. The particulars of the subset summing approach will become evident as the discussion progresses.

The present solution can be used in various applications. For example, the present solution can be used in (i) sensor control applications (e.g., to determine which action(s) should be taken or task(s) sensor(s) should be performing at any given time), (ii) vehicle or craft navigation applications (e.g., to determine which direction a ship should travel to avoid an obstacle), (iii) dynamic network applications (e.g., to determine which is the best plan for dynamic resource allocation), (iv) search and rescue applications (e.g., to determine which grid a drone or other sensor device should proceed to for efficient search and rescue), (v) unmanned vehicle control applications (e.g., to determine what is an optimal positioning of an unmanned vehicle to achieve communication linking), (vi) natural resource exploration applications (e.g., to determine which acoustic ray trace should be used for oil and gas exploration), (vii) image analysis applications (e.g., to determine which land use land cover tag should be used to label a pixel for image feature extraction), (viii) robot control applications (e.g., to determine which path is the most efficient for a robot to travel to a destination), (ix) observation applications (e.g., which machine learning algorithm or model in an ensemble should be used for a given observation—which frequency should a transmitter hop to avoid jamming or which modulation type is received), (x) network node or personnel management applications (e.g., to determined which network node or person is the most important or influential), (xi) situational awareness applications (e.g., to determine which emotion or personality is being displayed by a person), (xii) business applications (e.g., to determine which opportunity should a business pursue, and/or what training does each employee need to achieve a next level most efficiently), and/or (xiii) aircraft control applications (e.g., to determine what is an optimal aircraft for noise mitigation).

The present solution will be described herein in terms of application (ix) mentioned above (i.e., (ix) observation applications (e.g., which machine learning algorithm or model in an ensemble should be used for a given observation—which frequency should a transmitter hop to avoid jamming or which modulation type is received)). The present solution is not limited in this regard.

Illustrative Quantum Computing Implementation

Referring now to FIG. 1, there is provided an illustration that is useful for understanding the present solution. During operation, data 100 is provided to a reward matrix generator 102. The reward matrix generator 102 processes the data to generate a reward matrix 104. Methods for generating reward matrices are well known. Some known methods for generating reward matrices are based on attributes, objects, keywords, relevance, semantics, and linguistics of input data.

The reward matrix 104 is then input into a quantum processor 106. The quantum processor 106 first performs operations to convert the given format (e.g., a binary/bit format) of the reward matrix 104 into a quantum/qubit format. Techniques for converting bits into qubits are well known. The qubits are then stored in quantum registers 110 of the quantum processor 106. Quantum registers are well known, and techniques for storing qubits in quantum registers are well known.

The quantum processor 106 uses the qubits to perform subset summing operations in which a plurality of row selections 108 are made based on different combinations of values in the reward matrix 104. Each row of the reward matrix 104 has a respective choice (or decision) associated therewith. These choices (or decisions) can include, but are not limited to, actions, tasks, directions, plans, grids, positions, acoustic ray traces, tags, paths, machine learning algorithms, network nodes, people, emotions/personalities, business opportunities, and/or vehicles (e.g., cars, trucks, and/or aircrafts). The particulars of the subset summing operations will become evident as the discussion progresses.

Next, the quantum processor 106 analyzes the row selections 108 resulting from the subset summing operations, and determines total counts for each row selection. For example, a first row of the reward matrix was selected 32 times, thus the total count for the first row is 32. A second row of the reward matrix was selected 59 times, thus the total count for the second row is 59. Similar is performed for the third row.

The present solution is not limited to the particulars of this example. A histogram of the total counts may then be generated. Quantum normalized probabilities are determined for the row selections. Normalization can be performed as typically done, or after subtracting a value equal to the number of combinations that have only a single choice considered. The quantum processor 106 makes decision(s) 108 based on the best quantum normalized probability(ies).

The quantum processor 106 also performs operations to cause operations of electronic device(s) 112 to be controlled in accordance with the decision(s) 108. Although the quantum processor 106 is shown as being external to the electronic device 112, the present solution is not limited in this regard. The quantum process can be part of, disposed inside or otherwise incorporated or integrated with the electronic device 112. The electronic device can include, but is not limited to, a sensor (e.g., an environmental sensor, a camera, a drone, a sound source for ray tracing), a network node, a computing device, a robot, a vehicle (e.g., manned, tele-operated, semi-autonomous, and/or autonomous) (e.g., a car, a truck, a plane, a drone, a boat, or a spacecraft), and/or a communication device (e.g., a phone, a radio, a satellite).

For example, a sensor (e.g., a camera, an unmanned vehicle (e.g., a drone), or a sound source for acoustic ray tracing) may be caused to (i) change position (e.g., field of view and/or antenna direction), location or path of travel, and/or (ii) perform a particular task (capture video, perform communications on a given channel, or ray tracing) at a particular time in accordance with decision(s) of the quantum processor. This can be involve transitioning an operational state of the sensor from a first operational state (e.g., a power save state or an off state) to a second operational state (e.g., a measurement state or on state). A navigation parameter of a vehicle (e.g., a car, a ship, a plane, a drone) or a robot may be caused to change in accordance with the decision(s) of the quantum processor. The navigation parameter can include, but is not limited to, a speed, and/or a direction of travel. A network may be cause to dynamically change a resource allocation in accordance with the decision (s) of the quantum processor. An autonomous vehicle can be caused to use a particular object classification scheme (e.g., assign a particular object classification to a detected object or data point(s) in a LiDAR point cloud) or trajectory generation scheme (e.g., use particular object/vehicle trajectory definitions or rules) in accordance with the decision(s) of the quantum processor so as to optimize autonomous driving operations (e.g., accelerate, decelerate, stop, turn, etc.). A cognitive radio can be controlled to use a particular machine learning algorithm to facilitate optimized wireless communications (e.g., via channel selection and/or interference mitigation) in accordance with the decision(s) of the quantum processor. A computing device can be caused to take a particular remedial measure to address a malicious attack (e.g., via malware) thereon in accordance with the decision(s) of the quantum processor. The present solution is not limited to the particulars of these examples.

An illustrative reward matrix 200 is provided FIG. 2. Reward matrix 104 of FIG. 1 can be the same as or similar to reward matrix 200. As such, the discussion of reward matrix 200 is sufficient for understanding reward matrix 104 of FIG. 1.

Reward matrix 200 comprises a plurality of rows $r_n$ and a plurality of columns $c_n$. Each row has an action assigned thereto. For example, a first row $r_1$ has Action1 (e.g., fire mortar) assigned thereto. A second row $r_2$ has Action2 (e.g., advance) assigned thereto. A third row $r_3$ has Action3 (e.g., do nothing) assigned thereto. Each column has a class assigned thereto. For example, a first column $c_2$ has a Class1 (e.g., an enemy truck) assigned thereto. A second column $c_2$ has a Class2 (e.g., civilian truck) assigned thereto. A third column $c_3$ has an Class3 (e.g., enemy tank) assigned thereto. A fourth column $c_4$ has a Class4 (e.g., a friendly tank) assigned thereto. A value is provided in each cell which falls within a given range, for example, −5 to 5.

A table 300 is provided in FIG. 3 that is useful for understanding an illustrative subset summing algorithm using the reward matrix 200 as an input. Table 300 shows subset summing results for different combinations of rows and columns in the reward matrix. Each subset summing result has a value between 1 and 3. A value of 1 indicates that a row $r_1$ and/or an Action1 is selected based on results from subset summing operation(s). A value of 2 indicates that a row $r_2$ and/or an Action2 is selected based on results from subset summing operation(s). A value of 3 indicates that a row $r_3$ and/or an Action3 is selected based on results of subset summing operation(s).

For example, a value of 1 is provided in a cell $302_1$ of table 300 since only one value in the reward matrix 200 is considered in a subset summing operation. The value of the reward matrix 200 is 4 because it resides in the cell which is associated with row $r_1$ and column $c_1$. The subset summing operation results in the selection of row $r_1$ and/or Action1 since 4 is a positive number and the only number under consideration. Therefore, a value of 1 is added to cell $302_1$ of table 300.

A value of 2 is provided in cell $302_2$ of table 300 since only one value in the reward matrix 200 is considered in a subset summing operation. The value of the reward matrix 200 is 1 because it is in the cell which is associated with row $r_2$ and column $c_1$. The subset summing operation results in the selection of row $r_2$ and/or Action2 since 1 is a positive number and the only number under consideration. Therefore, a value of 2 is added to cell $302_2$ of table 300.

A value of 3 is provided in cell $302_3$ of table 300 since only one value in the reward matrix 200 is considered in a subset summing operation. The value of the reward matrix 200 is 1 because it is in the cell which is associated with row $r_3$ and column $c_2$. The subset summing operation results in the selection of row $r_3$ and/or Action3 since 1 is a positive number and the only number under consideration. Therefore, a value of 3 is added to cell $302_3$ of table 300.

A value of 1 is in cell $302_4$ of table 300. In this case, two values in the reward matrix 200 are considered in a subset summing operation. The values of the reward matrix 200 include (i) 4 because it resides in the cell which is associated with row $r_1$ and column $c_1$, and (ii) 1 because it resides in the cell which is associated with row $r_2$ and column $c_1$. The two values are compared to each other to determine the largest value. Since 4 is greater than 1, row $r_1$ and/or Action1 is selected. Accordingly, a value of 1 is inserted into cell $302_4$ of table 300.

It should be noted that other values of reward matrix 200 are considered when a negative value is the only value under consideration. For example, a value of 1 is in cell $302_5$ of table 300 rather than a value of 3. This is because a value of −1 resides in the cell of reward matrix 200 that is associated with row $r_3$ and column $c_1$. Since this value is negative, other values in column $c_1$ of reward matrix 200 are considered. These other values include (i) 4 because it resides in the cell of the reward matrix 200 which is associated with row $r_1$ and column $c_1$, and (ii) 1 because it resides in the cell of the reward matrix 200 which is associated with row $r_2$ and column $c_1$. These two other values are compared to each other to determine the largest value. Since 4 is greater than 1, row $r_1$ and/or Action1 is selected. Accordingly, a value of 1 is inserted into cell $302_5$ of table 300.

When values in two or more columns and rows of reward matrix 200 are considered and a single cell of reward matrix 200 has the greatest value of the values under consideration, an action is selected that is associated with the cell having the greatest value. For example, a value of 1 is in cell $302_6$ of table 300. In this case, values in two columns $c_1$ and $c_2$ and two rows $r_1$ and $r_3$ of reward matrix 200 are considered. For row $r_1$, the values include 4 and −4. For row $r_3$, the values include −1 and 1. The four values are compared to each other to identify the greatest value. Here, the greatest value is 4. Since 4 is in a cell associated with Action1, row $r_1$ and/or Action1 is selected and a value of 1 is inserted into cell $302_6$ of table 300.

It should be noted that an addition operation may be performed for each row prior to performance of the comparison operation. For example, a value of 2 is in cell $302_7$ of table 300. In this case, values in two columns $c_1$ and $c_2$ and two rows $r_1$ and $r_2$ of reward matrix 200 are considered. For row $r_1$, the values include 4 and −4. For row $r_2$, the values include 1 and 4. Since both rows $r_1$ and $r_2$ include the greatest value of 4, an addition operation is performed for each row, i.e., $r_1$=4+−4=0, $r_2$=1+4=5. Since 5 is greater than 0, row $r_2$ and/or Action1 is selected. Thus, a value of 2 is inserted into cell $302_7$ of table 300, rather than a value of 1.

Once table 300 is fully populated, a total count is determined for each value 1, 2 and 3 in table 300. For example, there are 34 occurrences of value 1 in table 300, thus the total count for 1 is 34. A total count for 2 is 59. A total count for 3 is 12. A quantum histogram for the total counts is provided in FIG. 4(*a*).

Quantum normalized probabilities for row decisions are also determined. Techniques for determining quantum normalized probabilities are well known. Normalization can be performed as typically done, or after subtracting a value equal to the number of combinations that have only a single choice considered. A graph showing the quantum normalized probability for each row action decision is provided in FIG. 4(*b*). FIG. 4(*b*) indicates that row $r_1$ and/or Action1 should be selected 31.884% of the time, row $r_2$ and/or Action2 should be selected 68.116% of the time, and row $r_3$ and/or Action3 should be selected 0% of the time. The output of the subset summing operations is Action2 since it is associated with the best quantum normalized probability.

Quantum circuits have been constructed to support the addition and comparison of two binary numbers. These quantum circuits can be used to implement the above described subset summing algorithm. More specifically, the above described subset summing algorithm can be implemented using quantum comparator circuits and quantum adder circuits. The quantum comparator circuit can be used to implement conditional statements in quantum computation. Quantum algorithms can be used to find minimal and maximal values. The quantum adder circuit can be used to assembly complex data sets for comparison and processing. An illustrative quantum comparator circuit is provided in FIG. 5. An illustrative quantum adder circuit is provided in FIG. 6.

Figure 5:
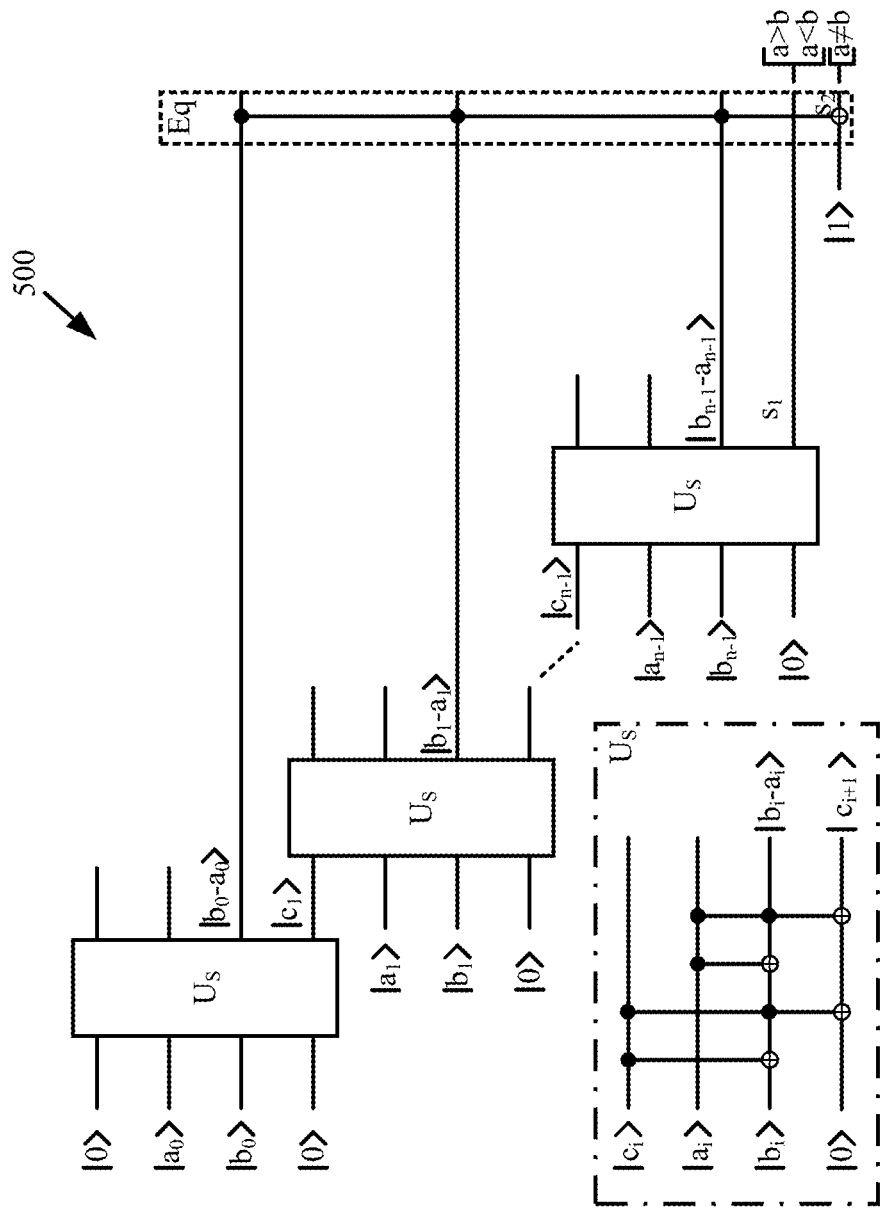
FIG. 5 provides an illustration of an illustrative quantum comparator circuit.

As shown in FIG. 5, the quantum comparator circuit 500 comprises a quantum bit string comparator configured to compare two strings of qubits $a_n$ and $b_n$ using subtraction. Quantum comparator circuit 500 is well known. Still, it should be understood that each string comprises n qubits representing a given number. Qubit string $a_n$ can be written as $a_n = a_{n-1}, \ldots, a_0$, where $a_0$ is the lowest order bit. Qubit string $b_n$ can be written as $b_n = b_{n-1}, \ldots, b_0$, where $b_0$ is the lowest order bit. The qubits are stored in quantum registers using quantum gate operators.

This comparison is performed to determine whether the qubit string $a_n$ is greater than, less than or equal to the qubit string $b_n$. The comparison operation is achieved using a plurality of quantum subtraction circuits Us. Each quantum subtraction circuit is configured to subtract a quantum state $|a_i\rangle$ from a quantum state $|b_i\rangle$ via xor ($\oplus$) operations, and pass the result to a quantum gate circuit Eq. A quantum state for a control bit c is also passed to a next quantum subtraction circuit for use in a next quantum subtraction operation. The last quantum subtraction circuit outputs a decision bit $s_1$. If the qubit string $a_n$ is greater than the qubits string $b_n$, then an output bit $s_1$ is set to a value of 1. If the qubit string $a_n$ is less than the qubits string $b_n$, then an output bit $s_1$ is set to a value of 0.

The quantum gate circuit Eq orders the subtraction results and uses the ordered subtraction results $|b_0-a_0\rangle$, $|b_1-a_1\rangle, \ldots, |b_{n-1}-a_{n-1}\rangle$ to determine whether the qubit string $a_n$ is equal to the qubits string bn. If so, an output bit $s_2$ is set to a value of 1. Otherwise, the output bit $s_2$ is set to a value of 0.

Figure 6:
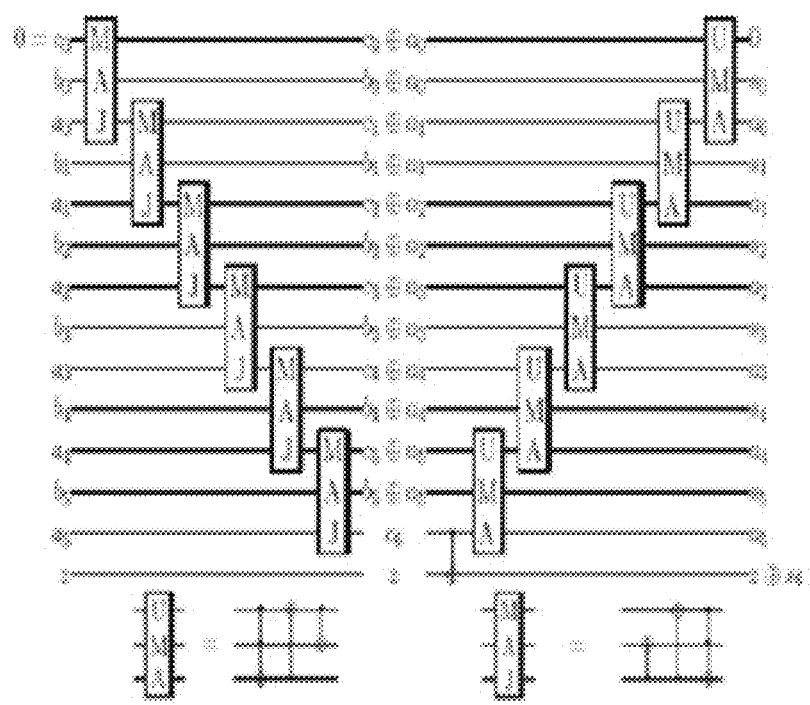
FIGS. 6 and 7 each provide an illustration of an illustrative quantum adder circuit.
Figure 7:
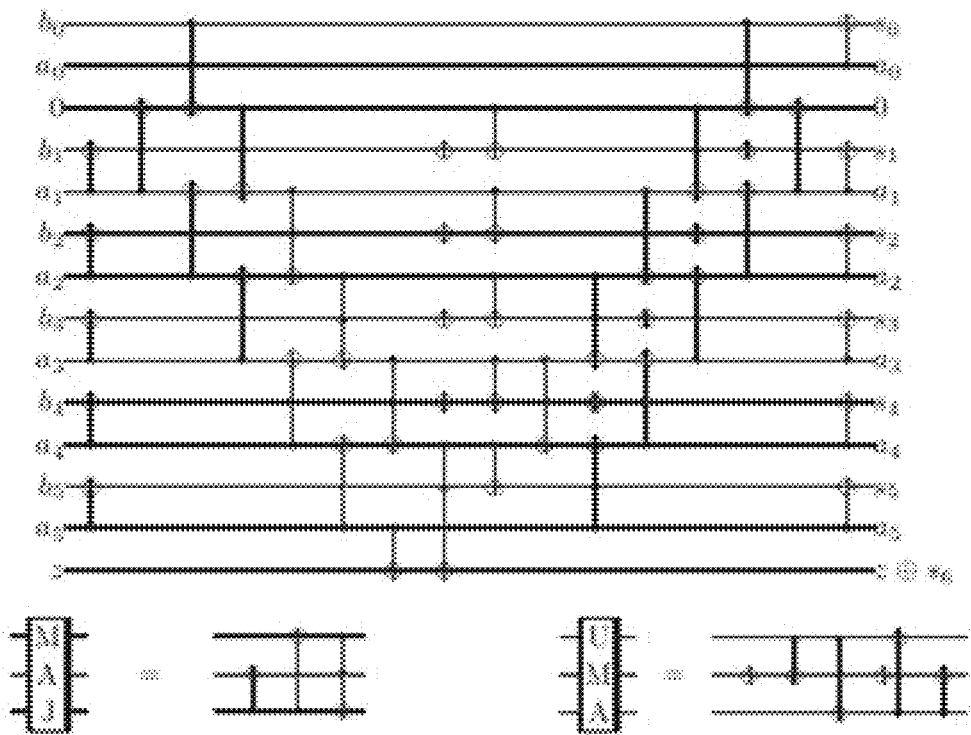

As shown in FIGS. 6 and 7, the quantum adder circuit 600, 700 comprises a quantum ripple-carry addition circuit configured to compute a sum of the two strings of qubits $a_n$ and $b_n$ together. The quantum ripple-carry addition circuits should in FIGS. 6-7 are well known. The circuits of FIGS. 6 and 7 implement an in-place majority (MAJ) gate with two Conditioned-NOT (CNOT) gates and one Toffoli gate. The MAJ gate is a logic gate that implements the majority function via xor ($\oplus$)operations. In this regard, the MAJ gate computes the majority of three bits in place. The MAJ gate outputs a high when the majority of the three input bits are high value, or outputs a low when the majority of the three input bits are low. The circuit of FIG. 6 implements a 2-CNOT version of the UnMajority and Add (UMA) gate, while the circuit of FIG. 7 implements a 3-CNOT version of the UMA gate. The UMA gate restores some of the majority computation, and captures the sum but in the b operand.

The qubit string an can be written as $a_n=a_{n-1}, \ldots, a_0$, where $a_0$ is the lowest order bit. Qubit string $b_n$ can be written as $b_n=b_{n-1}, \ldots, b_0$, where $b_0$ is the lowest order bit. Qubit string an is stored in a memory location $A_n$, and qubit string $b_n$ is stored in a memory location $B_n$. $c_n$ represents a carry bit. The MAJ gate writes $c_{n+1}$ into $A_n$, and continues a computation using $c_{n+1}$. When done using $c_{n+1}$, the UMA gate is applied which restores an to $A_n$, restores $c_n$ to $A_{n-1}$, and writes $s_n$ to $B_n$.

Both circuits of FIGS. 6 and 7 are shown for strings including 6 bits. The present solution is not limited in this regard. A person skilled in the art would understand that the circuits of FIGS. 6 and 7 can be modified for any number of bits n in strings an and bn.

Figure 8:
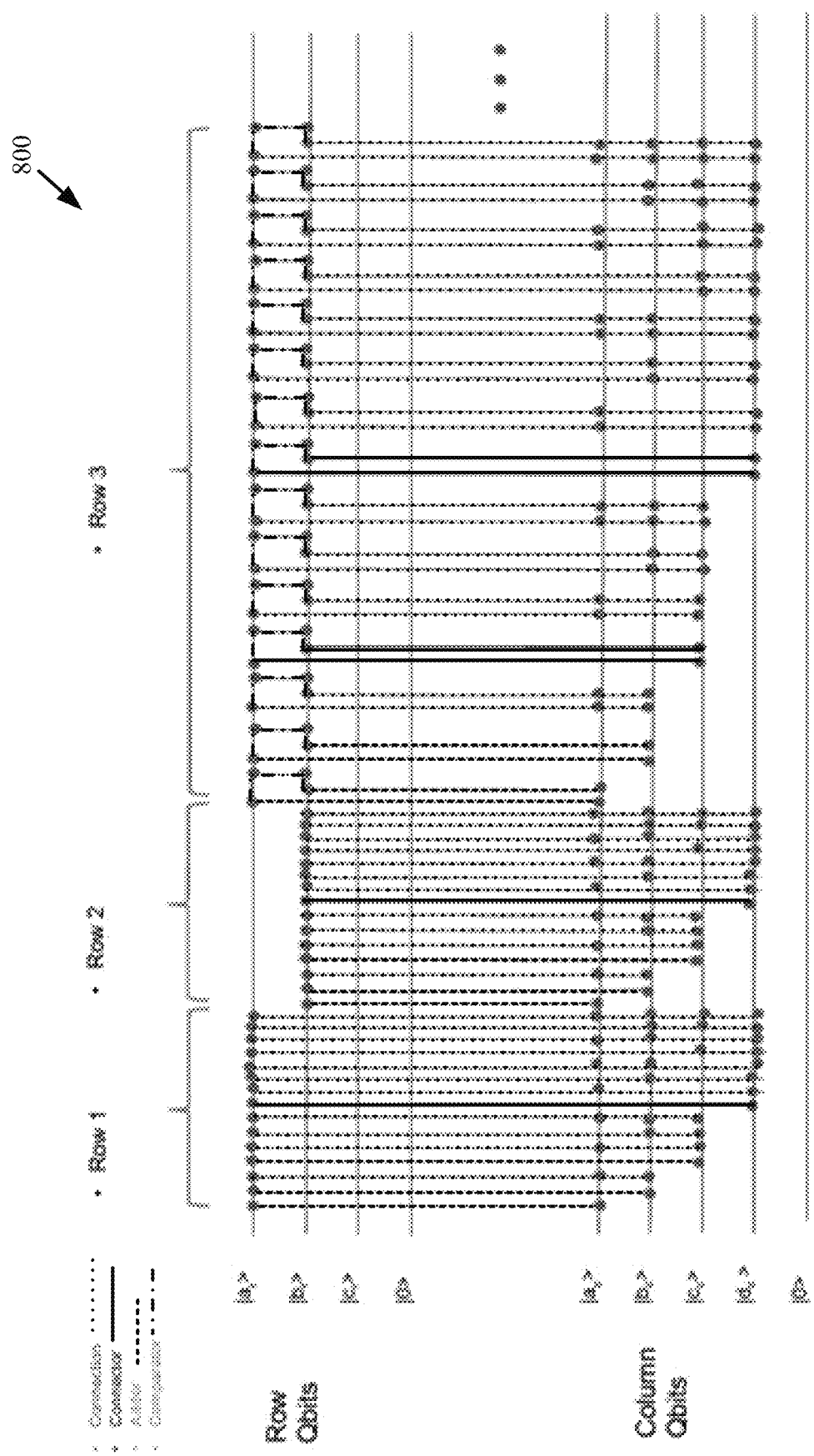
FIG. 8 provides an illustration of an illustrative quantum processor circuit.

An illustrative quantum processor 800 implementing the subset summing algorithm of the present solution is shown in FIG. 8. The quantum processor 106 of FIG. 1 can be the same as or similar to quantum processor 800. As such, the discussion of quantum processor 800 is sufficient for understanding quantum processor 106 of FIG. 1.

As shown in FIG. 8, quantum processor 800 comprises a plurality of quantum adder circuits and a plurality of quantum comparison circuits. The quantum adder circuits can include, but are not limited to, quantum adder circuit 600 of FIG. 6 and/or quantum adder circuit 700 of FIG. 7. The quantum comparison circuits can include, but are not limited to, quantum comparator circuit 500 of FIG. 5.

Figure 9:
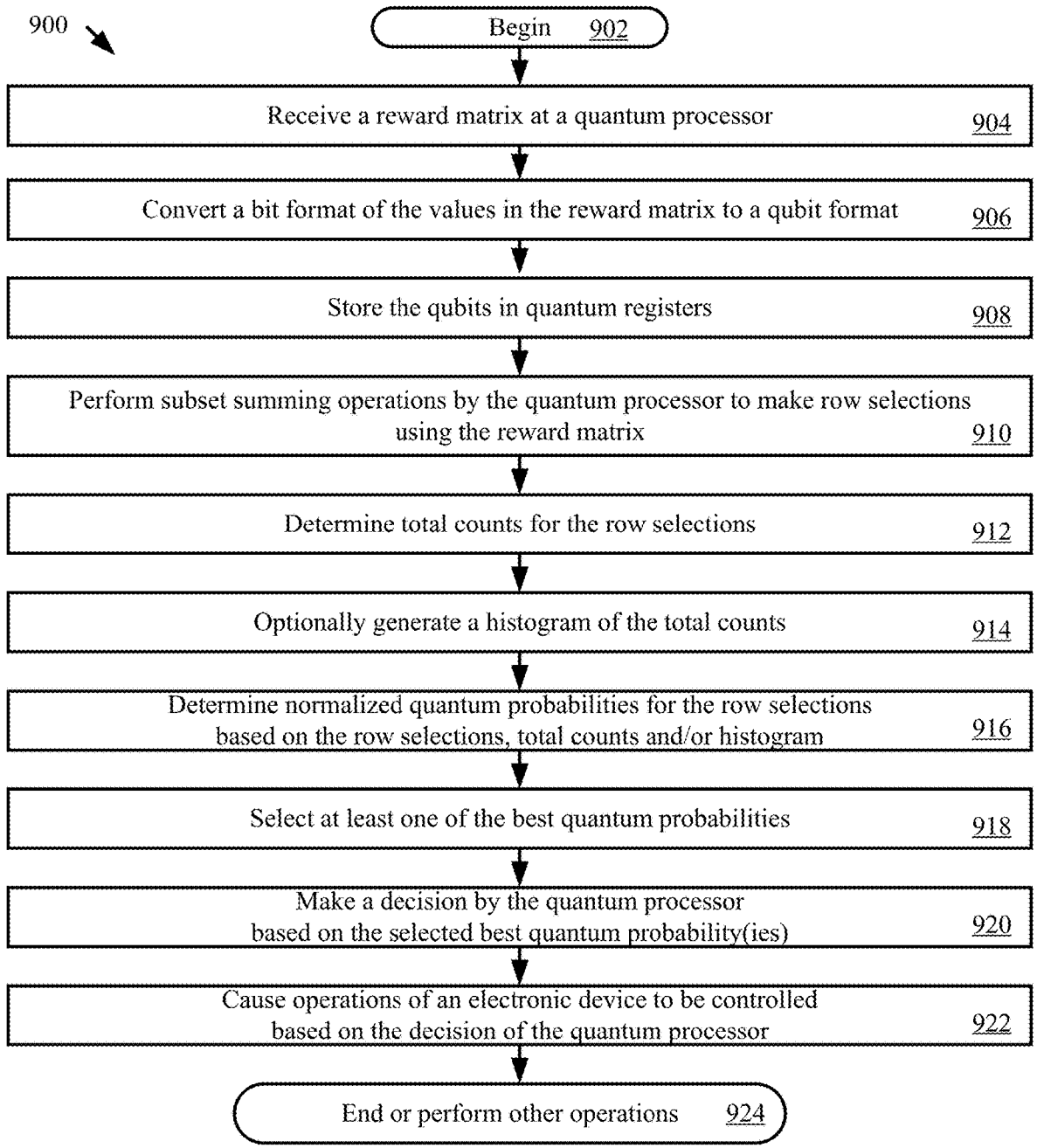
FIG. 9 provides a flow diagram of an illustrative method for operating a quantum processor.

Referring now to FIG. 9, there is provided a flow diagram of an illustrative method 900 for operating a quantum processor (e.g., quantum processor 106 of FIG. 1 and/or 800 of FIG. 8. The method 900 begins with 902 and continues with 904 where a reward matrix (e.g., reward matrix 104 of FIG. 1 and/or 200 of FIG. 2) is received at the quantum processor. The reward matrix comprises a plurality of values that are in a given format (e.g., a bit format) and arranged in a plurality of rows (e.g., rows $r_1$, $r_2$ and $r_3$ of FIG. 2) and a plurality of columns (e.g., columns $c_1$, $c_2$, $c_3$ and $c_4$ of FIG. 2). Each row of the reward matrix has a respective choice (or decision) associated therewith. The respective choice (or decision) can include, but is not limited to, a respective action of a plurality of actions, a respective task of a plurality of tasks, a respective direction of a plurality of directions, a respective plan of a plurality of plans, a respective grid of a plurality of grids, a respective position of a plurality of positions, a respective acoustic ray trace of a plurality of acoustic ray traces, a respective tag of a plurality of tags, a respective path of a plurality of paths, a respective machine learning algorithm of a plurality of machine learning algorithms, a respective network node of a plurality of network nodes, a respective person of a group, a respective emotion of a plurality of emotions, a respective personality of a plurality of personalities, a respective business opportunity of a plurality of business opportunities, and/or a respective vehicle of a plurality of vehicles.

In 906, the quantum processor performs operations to convert the given format (e.g., bit format) of the plurality of values to a qubit format. Methods for converting bits to qubits are well known. Next in 908, the quantum process performs subset summing operations to make a plurality of row selections based on different combinations of the values in the qubit format. The subset summing operations can be the same or similar to those discussed above in relation to FIGS. 3-4.

The subset summing operations can be implemented by a plurality of quantum adder circuits and a plurality of quantum comparator circuits. The subset summing operations may comprise an operation in which at least one value of the reward matrix is considered and which results in a selection of the row of the reward matrix in which the value(s) reside(s). Additionally or alternatively, the subset summing operations may comprise: an operation in which at least two values of the reward matrix are considered and which results in a selection of the row of the reward matrix in which a largest value of the at least two values resides; an operation in which a single negative value of the reward matrix is considered and which results in a selection of the row of the reward matrix which is different than the row of the reward matrix in which the single negative value resides; an operation in which a plurality of values in at least two columns and at least two rows are considered, and which results in a selection of the row of the reward matrix associated with a largest value of the plurality of values in at least two columns and at least two rows; and/or an operation in which a plurality of values in at least two columns and at least two rows are considered, and which results in a selection of the row of the reward matrix associated with a largest sum of values in the at least two columns.

In 912-916, the quantum processor uses the plurality of row selections to determine a normalized quantum probability for a selection of each row of the plurality of rows. 912-916 involve: determining total counts for the row selections; optionally generating a histogram of the total counts; and determining normalized quantum probabilities for the row selections based on the row selections made in 910, total counts determined in 912 and/or histogram generated in 914. Methods for determining normalized quantum probabilities are well known. In some scenarios, a normalized quantum probability is determined by dividing a total count for a given row by a total number of row selections (e.g., a total count for a row r1 is 32 and a total number of row selections is 105 so the normalized quantum probability=$^{34}/_{105}$=approximately 32%).

In 918, the quantum processor selects at least one of the best quantum probabilities from the normalized quantum probabilities determined in 916. The quantum processor makes a decision (e.g., decision 108 of FIG. 1) in 920 based on the selected best quantum probability(ies). In 922, the quantum processor causes operations of an electronic device (e.g., electronic device 112 of FIG. 1) to be controlled or changed based on the decision.

For example, the quantum processor causes the electronic device to transition operational states (e.g., from an off state to an on state, or vice versa), change position (e.g., change a field of view or change an antenna pointing direction), change location, change a navigation parameter (e.g., change a speed or direction of travel), perform a particular task (e.g., schedule an event), change a resource allocation, use a particular machine learning algorithm to optimize wireless communications, and/or use a particular object classification scheme or trajectory generation scheme to optimize autonomous driving operations (e.g., accelerate, decelerate, stop, turn, perform an emergency action, perform a caution action, etc.).

The implementing systems of method 900 may comprise a circuit (e.g., quantum registers, quantum adder circuits, and/or quantum comparator circuits), and/or a non-transitory computer-readable storage medium comprising programming instructions that are configured to cause the quantum processor to implement method 900.

Illustrative Use Case for Quantum Processor

Signal recognition and classification has been accomplished using feature-based, expert-system-driven (i.e., non-machine-learning) techniques. The feature-based, expert-system-driven techniques are relatively computationally slow and costly to implement. The present solution provides an alternative solution for signal recognition and classification that overcomes the drawbacks of conventional feature-based, expert-system-driven solutions.

The present solution employs a machine-learning based approach which provides a faster, less-expensive path to adding new signals to a list of recognized signals, offers better recognition performance at lower Signal-to-Noise Ratios (SNRs), and recognizes signals and sources thereof faster and with an improved accuracy as compared to that of the conventional feature-based, expert-system-driven solutions. In some scenarios, the machine-learning based approach uses expert systems and/or deep learning to facilitate signal recognition and classification. The deep learning can be implemented by one or more neural networks (e.g., Residual Neural Network(s) (ResNet(s)), and/or Convolutional Neural Network(s) (CNN(s))). The neural networks may be stacked to provide a plurality of layers of convolution. The neural networks are trained to automatically recognize and determine modulation types of received wireless communication signals from sub-sampled data. This training can be achieved, for example, using a dataset that includes information for signals having SNRs from −20 dB to +30 db and being modulated in accordance with a plurality of analog and/or digital modulation schemes (e.g., phase shift keying, and/or amplitude shift keying).

The machine-learning based approach of the present solution can be implemented to provide a cognitive, automated system to optimize signal classification analyses by modulation choices from data with various SNRs (e.g., SNRs from −20 dB to +30 db). Subsystems can include, but are not limited to, a tuner, a digitizer, a classifier, and/or an optimizer. Fast recognition and labeling of Radio Frequency (RF) signals in the vicinity is a needed function for Signal Intelligence (SIGINT) devices, spectrum interference monitoring, dynamic spectrum access, and/or mesh networking.

Artificial intelligence (AI) algorithms, machine-learning algorithms and/or game theoretic analysis is used to help solve the problem of signal classification through supervised classification. The game theory analysis provides a flexible framework to model strategies for improved decision-making optimization. Classification strategies may be based on different supervised gradient descent learning algorithms and/or different neural network structures. The players are networks, and the action is to choose the goodness-of-fit weighting of the network for optimal decision making. A novel, game-theoretic perspective has been derived for solving the problem of supervised classification that takes the best signal modulation prediction derived from supervised classification models. This is a game in the sense that the signals are "players" that participate in the game to determine their modulation type by choosing the best network model. Within this formulation, a reward matrix (weighted or non-weighted) is used for consistent classification factors that results in higher accuracy and precision compared to using individual machine learning algorithms or models alone.

The reward matrix comprises an M×C matrix, where M is the number of machine learned algorithms and C is the number of modulation classes. The reward matrix uses goodness-of-fit-predicted class scores or responses in the form of a matrix based on the number of signals and modulation classes. These goodness-of-fit-predicted class scores are used in a quantum computing program to optimally choose which machine learned algorithm to use per signal.

Figure 10:
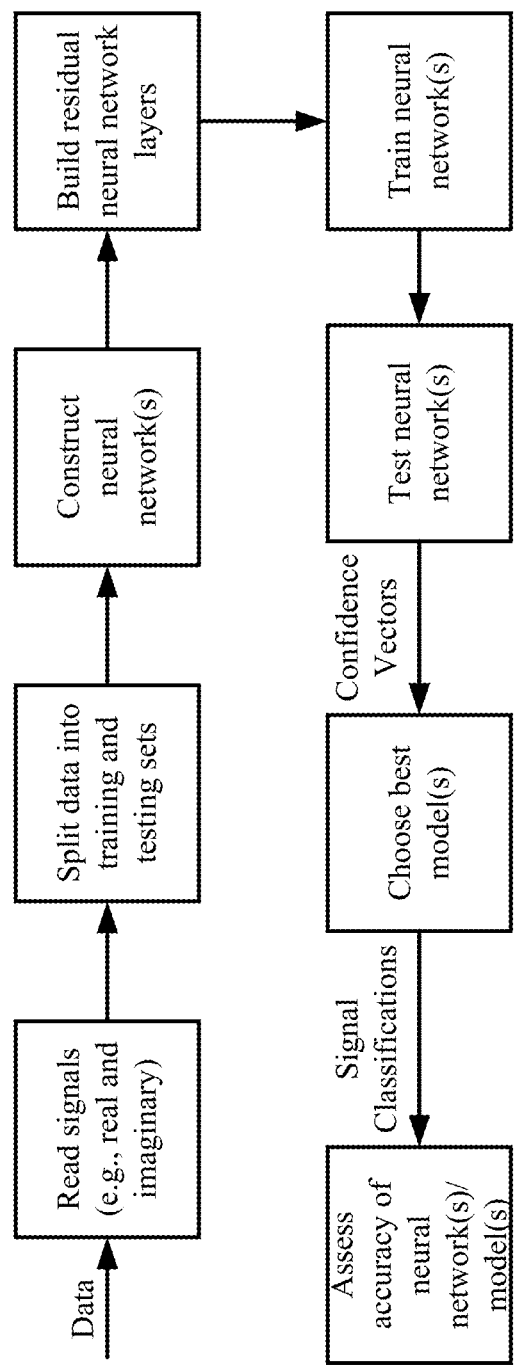
FIG. 10 provides an illustration of an illustrative signal classification system.

FIG. 10 presents an overview of the signal classification system. The signal classification system is generally configured to generate machine learned models including sets of signal features/characteristics that can be used to recognize and classify signals and/or sources of signals. These sets of signal features/characteristics are then stored in a datastore (s) and/or used by communication devices (e.g., cognitive radios) to determine, for example, whether wireless channels are available or unavailable.

The communication devices can include, but are not limited to, cognitive radios configured to recognize and classify radio signals by modulation type at various Signal-to-Noise Ratios (SNRs). Each of the cognitive devices comprises a cognitive sensor employing machine learning algorithms. In some scenarios, the machine learned algorithms include neural networks which are trained and tested using an extensive dataset consisting of 24 digital and analog modulations. The neural networks learn from the time domain amplitude and phase information of the modulation schemes present in the dataset. The machine learning algorithms facilitate making preliminary estimations of modulation types and/or signal sources based on machine learned signal feature/characteristic sets. Quantum computing optimization may be used to determine the best modulation classification based on prediction scores output from one or more machine learning algorithms.

Figure 11:
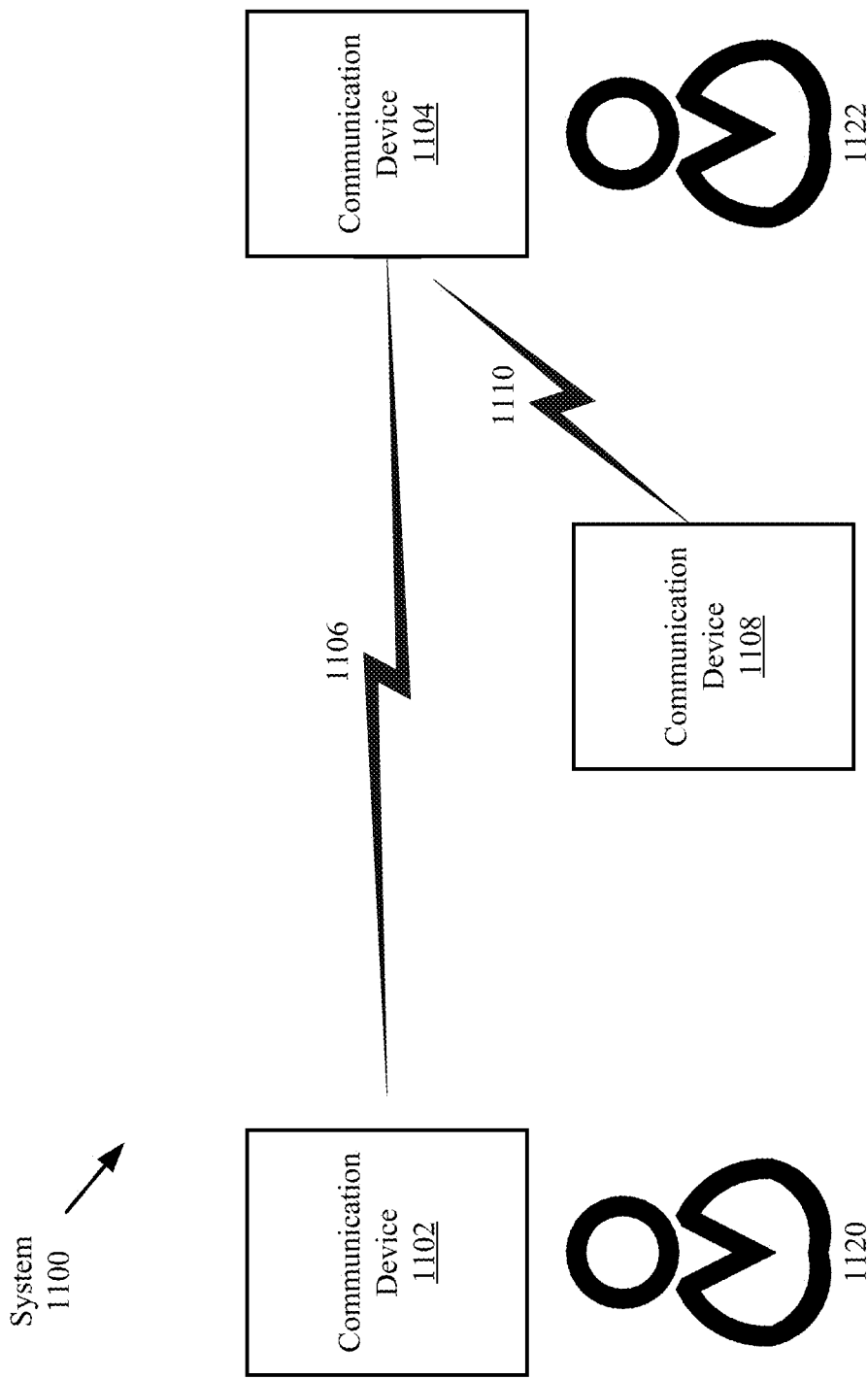
FIG. 11 provides an illustration of an illustrative system configured to perform signal recognition and classification in accordance with the present solution.

Referring to FIG. 11, there is provided an illustration of an illustrative communications system 1100. Communications system 1100 is generally configured to allow communications amongst communication devices 1102, 1104, 1108 over wireless channels 1106, 1110 in a waveform spectrum. The communication devices can include, but are not limited to, cognitive radios. Each cognitive radio is configured to dynamically share the wireless channels 1106, 1110 to avoid user interference and congestion. The manner in which the communication devices perform dynamic spectrum sharing and/or dynamically transition between wireless channels will be described below in relation to FIG. 12.

A user 1120 of communication device 1102 is a primary user of wireless channel 1106. As such, the user 1120 has first rights to communicate information over wireless channel 1106 via communication device 1102 a given amount of time (e.g., X microseconds, where X is an integer). User 1120 licensed use of the wireless channel 1106 to another user 1122. User 1122 constitutes a secondary user. Accordingly, user 1122 is able to use the wireless channel 1106 to communicate information to/from communication device 1104 during the time in which the wireless channel is not being used by the primary user 1120 for wireless communications. Detection of the primary user by the secondary user is critical to the cognitive radio environment. The present solution provides a novel solution for making such detections by secondary users in a shorter amount of time as compared to conventional solutions. The novel solution will become evident as the discussion progresses.

During operations, the communication device 1104 monitors communications on wireless channel 1106 to sense spectrum availability, i.e., determine an availability of the wireless channel. The wireless channel 1106 is available when the primary user 1120 is not and has not transmitted a signal thereover for a given amount of time. The wireless channel 1106 is unavailable when the primary user 1120 is transmitting a signal thereover or has transmitted a signal thereover within a given amount of time. When a determination is made that the wireless channel 1106 is unavailable, the communication device 1104 performs operations to transition to another wireless channel 1110. This channel transition may be achieved by changing an operational mode of the communication device 1104 and/or by changing channel parameter(s) of the communication device 1104. The communication device 1104 may transition back to wireless channel 1106 when a determination is made that the primary user 1120 is no longer using the same for communications.

Figure 12:
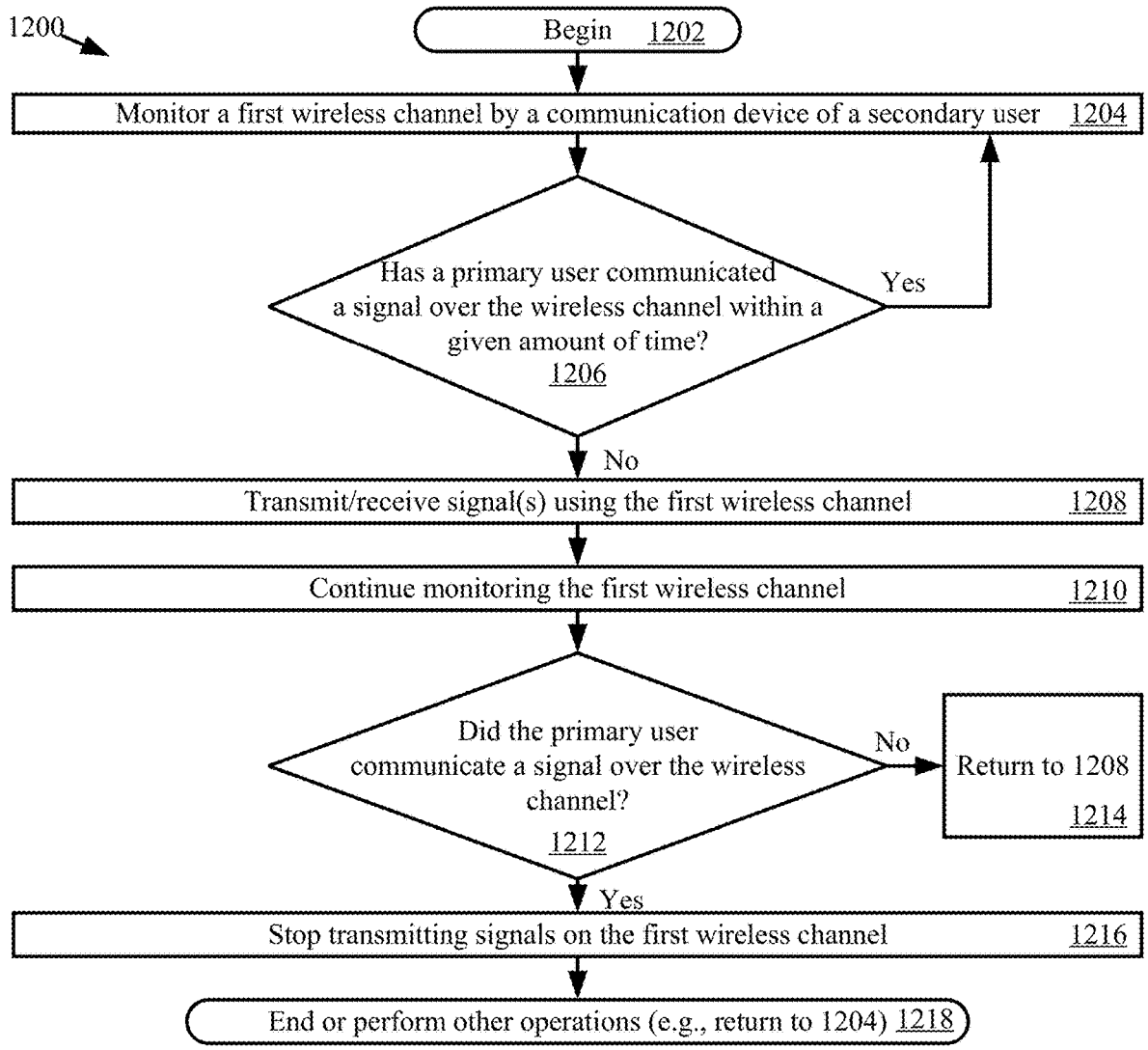
FIG. 12 provides a flow diagram of an illustrative method for operating the system of FIG. 10.

Referring now to FIG. 12, there is provided a flow diagram of an illustrative method 1200 for operating a system (e.g., system 1100 of FIG. 11). Method 1200 begins with 1202 and continues with 1204 where a communication device (e.g., communication device 1102 of FIG. 11) of a secondary user (e.g., user 1122 of FIG. 11) monitors at least one first wireless channel (e.g., wireless channel 1106 of FIG. 11) for availability. This monitoring involves: receiving signals communicated over the first wireless channel(s); and processing the signals to determine whether a primary user (e.g., user 1120 of FIG. 11) is using the first wireless channel(s) for communications. If so [1206:YES], then the wireless channel(s) is(are) considered unavailable. Accordingly, the communication device continues monitoring the first wireless channel(s). If not [1206:NO], then the wireless channel(s) is(are) considered available. As such, the communication device may use the first wireless channel(s) for communicating signals as shown by 1208.

As shown by 1210, the communication device continues to monitor the first wireless channel(s). The communication device continues to use the wireless channel(s) for a given period of time or until the primary user once again starts using the same for communications, as shown by 1212-1214. When the communication device detects that the primary user is once again using the wireless channel(s) [1212:YES], then the communication device stops transmitting signals on the first wireless channel(s) as shown by 1216. Subsequently, 1218 is performed where method 1200 ends or other operations are performed (e.g., return to 1204).

Figure 13:
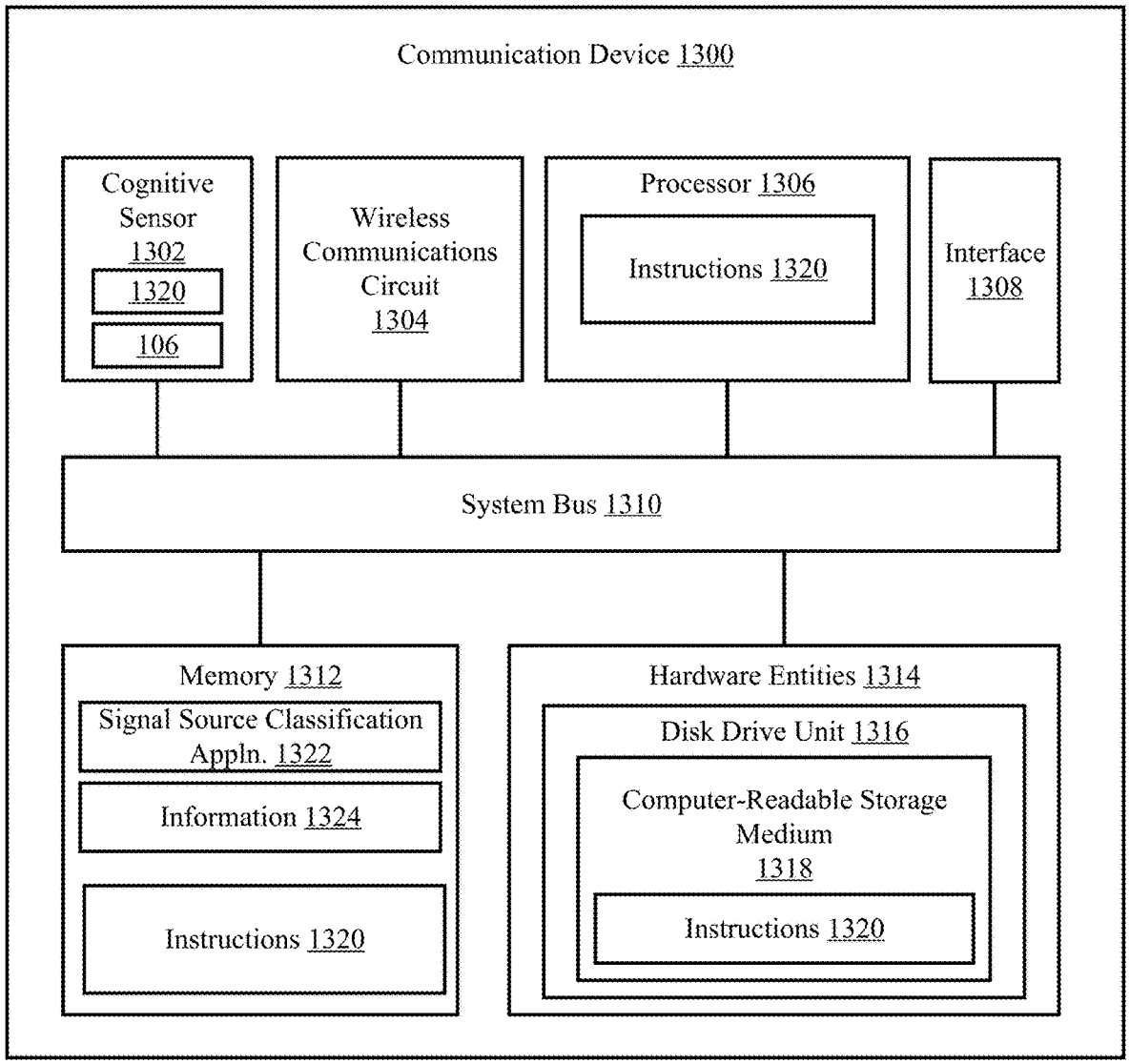
FIG. 13 provides a block diagram of an illustrative communication device.

A detailed block diagram of an illustrative architecture for a communication device is provided in FIG. 13. The communication devices 1102, 1104 and/or 1106 of FIG. 11 may be the same as or substantially similar to communication device 1300 of FIG. 13. As such, the discussion of communication device 1300 is sufficient for understanding communication devices 1102, 1104, 1106 of FIG. 11.

Communication device 1300 implements a machine learning algorithm to facilitate determinations as to an available/unavailable state of wireless channel(s) (e.g., wireless channel 1106 of FIG. 11). The communication device 1300 dynamically transitions communication operations between wireless channels based on the determined available/unavailable state(s) thereof. In this regard, the communication device 1300 includes a plurality of components shown in FIG. 13. The communication device 1300 may include more or less components than those shown in FIG. 13. However, the components shown are sufficient to disclose an illustrative solution implementing the present solution. The hardware architecture of FIG. 13 represents one implementation of a representative communication device configured to enable dynamic use of wireless channels to avoid user interference and congestion. As such, the communication device 1300 of FIG. 13 implements at least a portion of the method(s) described herein.

The communication device 1300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 13, the communication device 1300 comprises a cognitive sensor 1302, a wireless communications circuit 1304, a processor 1306, an interface 1308, a system bus 1310, a memory 1312 connected to and accessible by other portions of communication device 1300 through system bus 1310, and hardware entities 1314 connected to system bus 1310. The interface 1308 provides a means for electrically connecting the communication device 1300 to other external circuits (e.g., a charging dock or device).

The cognitive sensor 1302 is generally configured to determine a source of a signal transmitted over a wireless channel. This determination is made via a signal source classification application 1322 using information 1324. Information 1324 comprises outputs generated by one or more machine learning algorithms. The machine learning algorithm(s) can employ supervised machine learning. Supervised machine learning algorithms are well known in the art. In some scenarios, the machine learning algorithm(s) include(s), but is(are) not limited to, a gradient decent learning algorithm, a Residual neural network (ResNet), a Convolutional Neural Network (CNN), a Recurrent Neural Network (RNN) (e.g., a Long Short-Term Memory (LSTM) neural network), and/or a deep learning algorithm. The machine learning process implemented by the present solution can be built using Commercial-Off-The-Shelf (COTS) tools (e.g., SAS available from SAS Institute Inc. of Cary, North Carolina).

Each machine learning algorithm is provided one or more feature inputs for a received signal, and makes a decision as to a modulation classification for the received signal. In some scenarios, the machine learning algorithms include neural networks that produce outputs $h_i$ in accordance with the following mathematical equations.

$$h_i = L(w_i(x_i)) \quad (1)$$

$$h_i = L(w_1(x_1) + w_2(x_2) + \ldots w_1(x_i)) \quad (2)$$

where $L(\ )$ represents a likelihood ratio function, $w_1$, $w_1, \ldots, w_i$ each represent a weight, and $x_1, x_1, \ldots, x_i$ represent signal features. The signal features can include, but are not limited to, a center frequency, a change in frequency over time, a phase, a change in phase over time, amplitude, an average amplitude over time, a data rate, and a wavelength. The output $h_i$ includes a set of confidence scores. Each confidence score indicates a likelihood that a signal was modulated using a respective type of modulation. The set of confidence scores are stored in any format selected in accordance with a given application.

Figure 14:
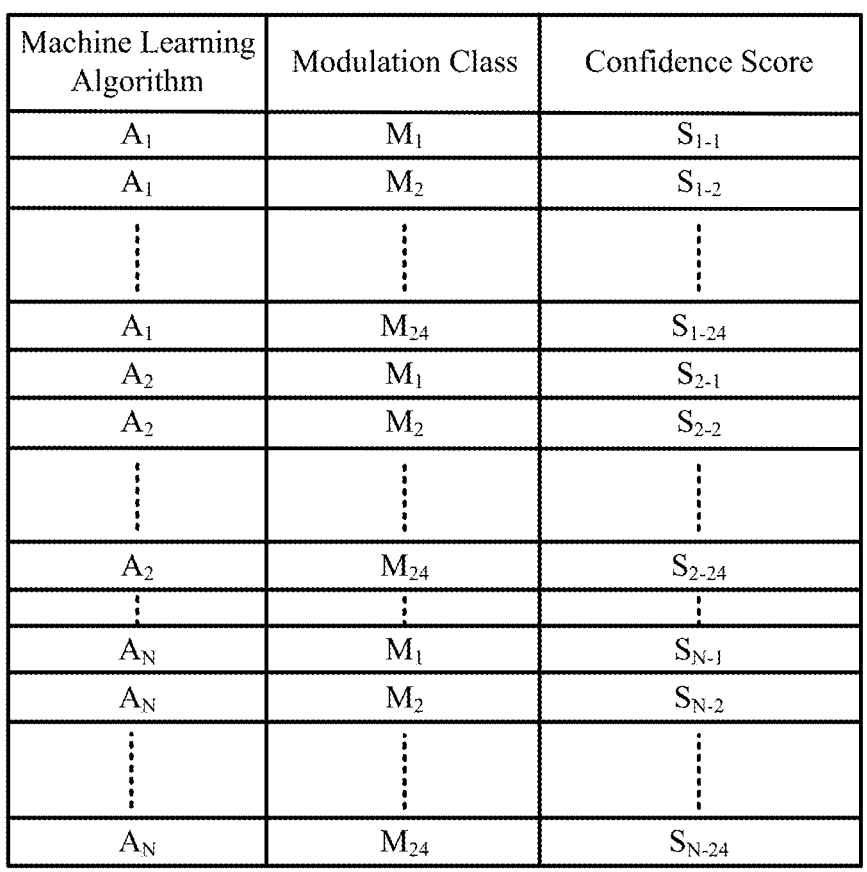
FIG. 14 provides a table showing illustrative machine learn related information.

For example, as shown in FIG. 14, the confidence scores (e.g., $S_{1-1}, S_{1-2}, \ldots, S_{1-24}, S_{2-1}, S_{2-2}, \ldots, S_{2-24}, \ldots, S_{N-1}, S_{N-2}, \ldots, S_{N-24}$) are stored in a table format so as to be associated with identifiers for machine learning algorithms (e.g., A1 identifying a first neural network, A2 identifying a second neural network, . . . , A1 identifying an $N^{th}$ neural network) and identifiers for modulation classes (e.g., $M_1$ identifying a first modulation class, $M_2$ identifying a second modulation class, . . . , $M_{24}$ identifying a twenty-fourth modulation class). The modulation classes can include, but are not limited to, On-Off Keying (OOF), 4 Amplitude Shift Keying (ASK), Binary Phase Shift Keying (BPSK), Quadrature Phase Shift Keying (QPSK), 8 Phase Shift Keying (PSK), 16 Quadrature Amplitude Modulation (QAM), OQPSK, 16PSK, 32PSK, 16 Amplitude and Phase Shift Keying (APSK), 32 APSK, 64 APSK, 128 APSK, 16 QAM, 32 QAM, 64 QAM, 128 QAM, 256 QAM, Amplitude Modulation-Single Sideband-With Carrier (AM-SSB-WC), Amplitude Modulation-Single Sideband-Suppressed Carrier (AM-SSB-SC), Amplitude Modulation-Double Sideband-With Carrier (AM-DSB-WC), Amplitude Modulation-Double Sideband-Suppressed Carrier (AM-DSB-SC), Frequency Modulation (FM), and/or Gaussian Minimum Shift Keying (GMSK). Each confidence score can include, but is not limited to, a likelihood score and/or a goodness-of-fit-predicted score. The goodness-of-fit-predicted score may be calculated based on the number of signals (e.g., 2.5 million) and the number of modulation classes (e.g., 24). The goodness-of-fit-predicted score describes how well the machine learning algorithm and modulation class fit a set of signal observations. A measure of goodness-of-fit summarizes the discrepancy between observed values and the values expected under the machine learning algorithm in question. The goodness-of-fit-predicted score can be determined, for example, using a chi-squared distribution algorithm and/or a likelihood ratio algorithm. The present solution is not limited to the particulars of this example.

The cognitive sensor 1302 then performs operations to either (i) select the modulation class associated with the highest confidence score or (ii) select one of the modulation classes for the signal based on results of an optimization algorithm. The optimization algorithm can include, but is not limited to, a game theory based optimization algorithm. The game theory based optimization algorithm will be discussed in detail below.

Once the modulation class has been decided for the received signal, the cognitive sensor 1302 then makes a decision as to whether the source of the signal was a primary user of the wireless spectrum. This decision is made based on the modulation class, a bit rate and/or a center frequency of the signal. For example, a decision is made that the primary user is the source of a signal when the signal comprises a 1 Mb/s BPSK signal with a center frequency of 10 MHz. The present solution is not limited in this regard.

At least some of the hardware entities 1314 perform actions involving access to and use of memory 1312, which can be a Random Access Memory (RAM), and/or a disk driver. Hardware entities 1314 can include a disk drive unit 1316 comprising a computer-readable storage medium 1318 on which is stored one or more sets of instructions 1320 (e.g., software code) configured to implement one or more of the methodologies, procedures, or functions described herein. The instructions 1320 can also reside, completely or at least partially, within the memory 1312, with the cognitive sensor 1320, and/or within the processor 1306 during execution thereof by the communication device 1300. The memory 1312, cognitive sensor 1320 and/or the processor 306 also can constitute machine-readable media. The term "machine-readable media", as used here, refers to a single medium or multiple media (e.g., a centralized or distributed database, and/or associated caches and servers) that store the one or more sets of instructions 1320. The term "machine-readable media", as used here, also refers to any medium that is capable of storing, encoding or carrying a set of instructions 1320 for execution by the processor 1306 and that cause the processor 306 to perform any one or more of the methodologies of the present disclosure.

Figure 15:
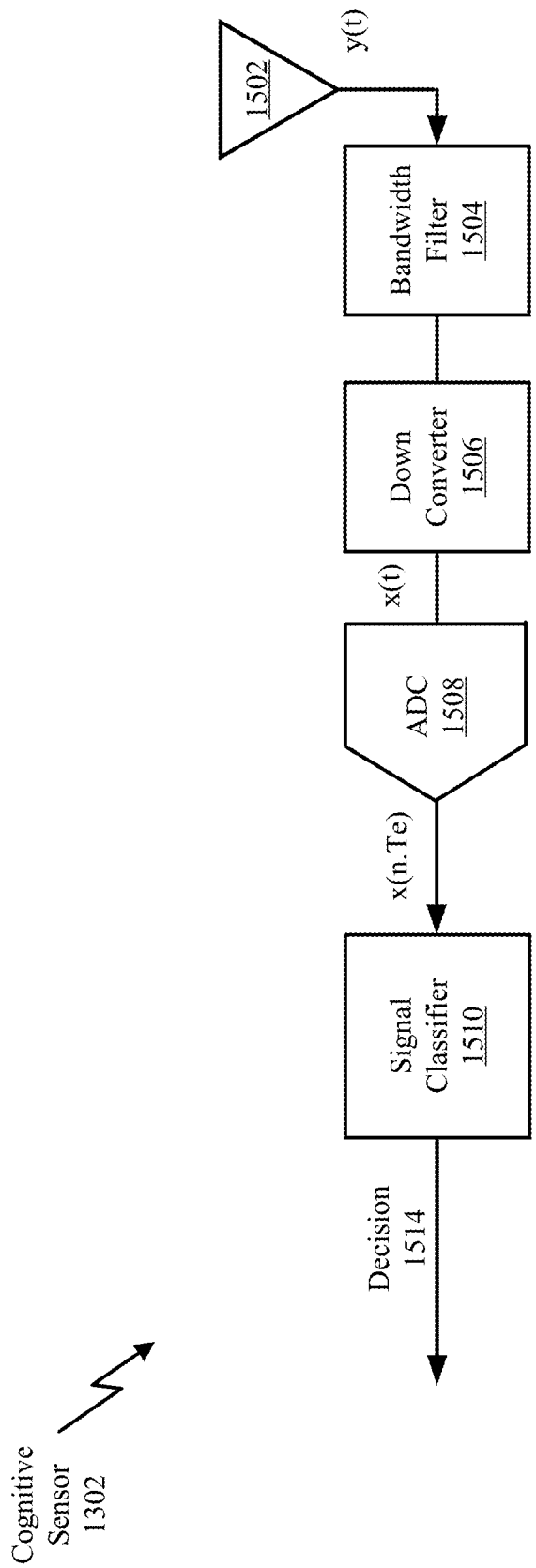
FIG. 15 provides a block diagram of an illustrative cognitive sensor.
Figure 16:
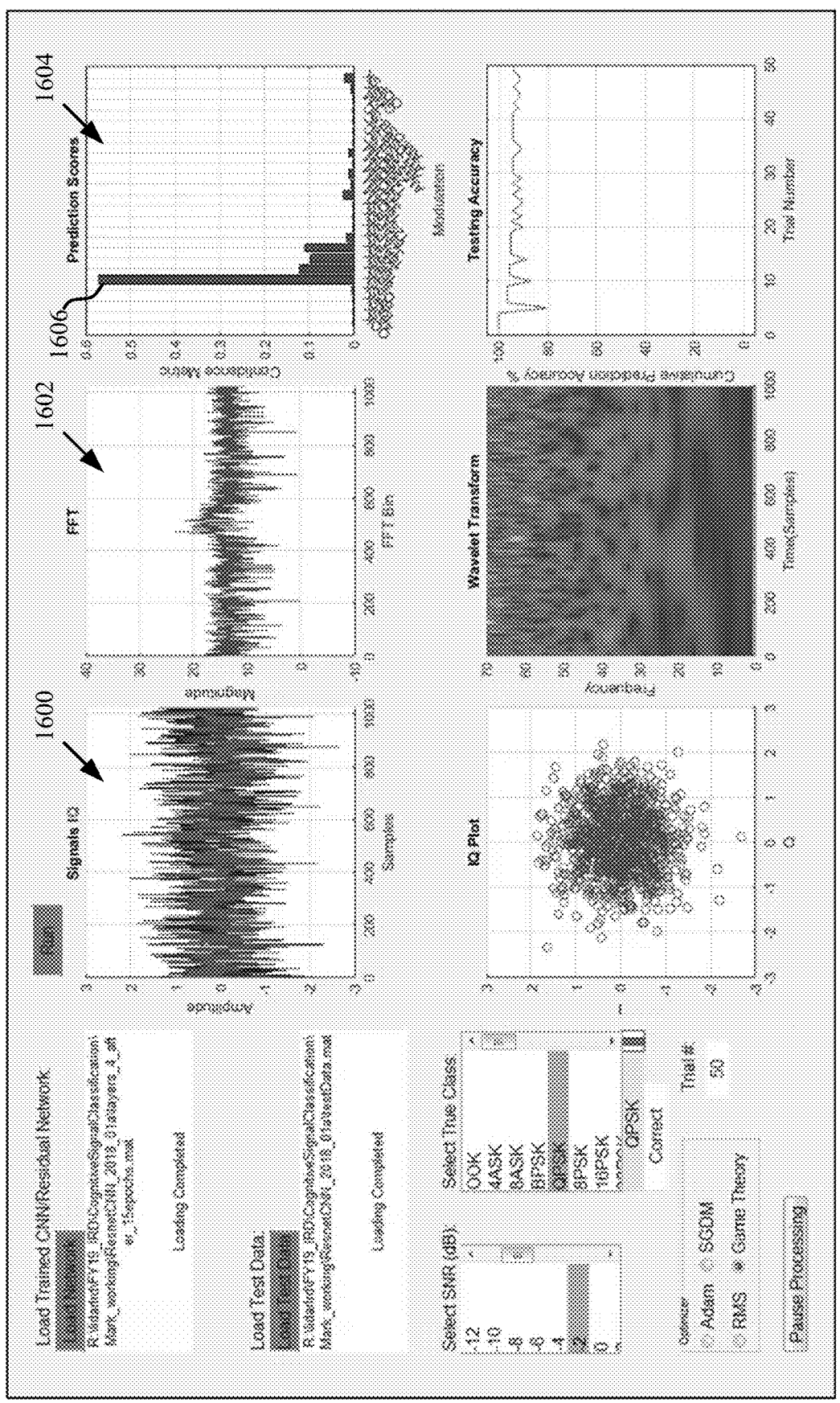
FIG. 16 provides graphs that are useful for understanding operations of the cognitive sensor shown in FIG. 15.

Referring now to FIG. 15, there is provided a more detailed diagram of the cognitive sensor 1302. As shown in FIG. 15, cognitive sensor 1302 is comprised of an antenna 1502, a bandwidth filter 1504, a down converter 1506, an Analog-to-Digital Converter (ADC) 1508, a machine learning algorithm selector 1510, and a signal classifier 1512. Antenna 1502 is configured to receive a radio signal y(t) transmitted from communication devices (e.g., communication device 1102, 1104 and/or 1108 of FIG. 11). An illustrative radio signal 1600 is shown in FIG. 16. The received radio signal y(t) is filtered on a bandwidth $B_L$ by bandwidth filter 1504, and then down converted by down converter 1506. The down converted signal x(t) is passed to the input of the ADC 1508. ADC 1508 is configured to convert analog voltage values to digital values, and communicate the digital values x(n.TE) to the signal classifier 1510.

The signal classifier 1512 uses one or more machine learning algorithms to (i) detect the radio signal y(t) in the presence of noise and (ii) make a decision 1514 as to the modulation classification that should be assigned thereto. For example, as shown in FIG. 16, a trained CNN/neural network is provided a Fast Fourier Transform input signal 1602, processes the input signal, and outputs prediction scores 1604 for a plurality of modulation classes. The signal is assigned a QPSK modulation class since it is associated with the highest predictions score 1606. The present solution is not limited to the particulars of this example. In other scenarios, an optimization algorithm is performed to select the modulation class to be assigned to the signal. The optimization algorithm can include, but is not limited to, a game theory based optimization algorithm, an Adam optimization algorithm, an a stochastic gradient decent optimization algorithm, and/or a root mean square optimization algorithm. It should be noted that the modulation class that is selected in accordance with the optimization algorithm may or may not be associated with the highest prediction/likelihood score.

Once the modulation classification has been decided for the signal, the signal classifier 1512 performs further operations to determine whether the primary user is the source of the signal. These operations can involve: obtaining the modulation class assigned to the signal; obtaining a bit rate and center frequency for the radio signal; and comparing the modulation class, bit rate and center frequency to pre-stored source information to determine if a match exists therebetween by a certain amount (e.g., the bit rates match by at least 70% and/or the center frequencies match by at least 50%). If a match exists, then the signal classifier 1512 decides that the primary user is the source of the radio signal and is using the band $B_L$. Otherwise, the signal classifier 1512 decides that someone other than the primary user is the source of the radio signal and trying to encroach on the band $B_L$. If the radio signally(t) is detected and the primary user is using the band $B_L$, then a decision is made that the band $B_L$ is unavailable. Otherwise, a decision is made that the band $B_L$ is available.

Figure 17:
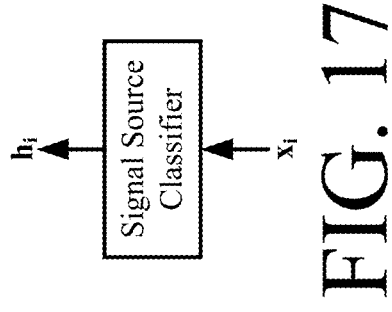

An illustrative architecture for a neural network implementing the present solution is provided in FIG. 17. As shown in FIG. 17, the neural network comprises a signal source classifier that performs one or more machine learning algorithms. Each machine learning algorithm uses an input $x_i$ and generates an output $h_i$. The input $x_i$ may be provided in a time domain (e.g., defines a waveform shape), a frequency domain, a phase domain and/or an amplitude domain. The output $h_i$ comprises a set of prediction/likelihood scores determined for a plurality of modulation classes. In some scenarios, the output $h_i$ is determined in accordance with the above provided mathematical equation (1) or (2).

Figure 18:
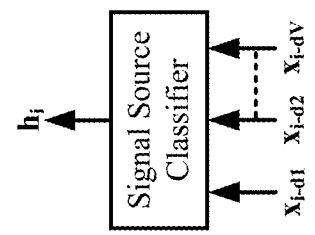

Another illustrative architecture for a neural network implementing the present solution is provided in FIG. 18. As shown in FIG. 18, the neural network comprises a signal source classifier that performs one or more machine learning algorithms. The signal source classifier receives a plurality of inputs $x_{i-d1}, x_{i-d2}, \ldots, x_{i-dV}$ and generates an output $h_i$. The inputs may be provided in different domains. For example, input $x_{i-d1}$ is provided in a frequency domain (e.g., defining a change in frequency over time). Input $x_{i-d2}$ is provided in a phase domain (e.g., defining a change in phase over time), while input $x_{i-dV}$ is provided in an amplitude domain (e.g., defining an average amplitude over time) or other domain (e.g., a time domain). The inputs $x_{i-d2}, \ldots, x_{i-dV}$ can be derived using various algorithms that include, but are not limited to, a Fourier transform algorithm, a power spectral density algorithm, a wavelet transform algorithm, and/or a spectrogram algorithm. Each machine learning algorithm uses a combination of the inputs to determine a set of prediction/likelihood scores. The inputs $x_{i-d1}, x_{i-d2}, \ldots, x_{i-dV}$ may be weighted differently by the machine learning algorithms. The weights can be pre-defined, or dynamically determined based on characteristic(s) of the received waveform. The prediction/likelihood scores are then analyzed to determine a modulation class to be assigned to the radio signal. For example, the modulation class is assigned to the radio signal which is associated with the highest prediction/likelihood score or which is associated with a prediction/likelihood score selected in accordance with an optimization algorithm (e.g., a game theory algorithm).

Figure 19:
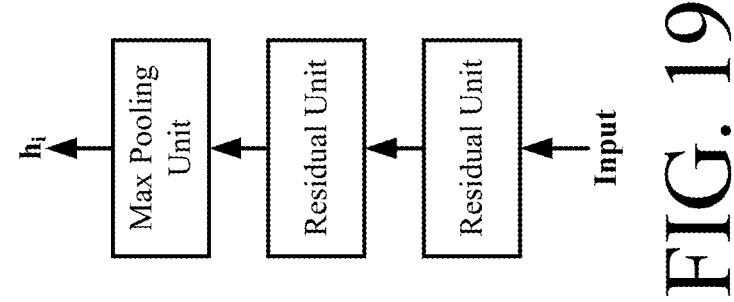
FIGS. 17-19 provide illustrations of illustrative machine learning algorithm architectures.

The present solution is not limited to the neural network architectures shown in FIG. 17-18. For example, the neural network can include a plurality of residual units that perform the machine learning algorithm in a sequential manner as shown in FIG. 19.

As noted above, the modulation class may be selected based on results of a game theory analysis of the machine learned models. The following discussion explains an illustrative game theory optimization algorithm.

Typical optimization of a reward matrix in a one-sided, "game against nature" with a goal of determining the highest minimum gain is performed using novel quantum computing techniques. In most cases, an optimal result is obtained, but occasionally one or more constraints eliminate possible feasible solutions. In this case, a quantum subset summing approach can be used. The quantum subset summing computes the optimal solution by determining the highest gain decision after iteratively considering all subsets of the possible decision alternatives.

A game theory analysis can be understood by considering a tactical game. Values for the tactical game are presented in the following TABLE 1. The unitless values range from −5 to 5, which indicate the reward received performing a given action for a particular scenario. The actions for the player correlate in the rows in TABLE 1, while the potential scenarios correlate to the columns in TABLE 1. For example, the action of firing a mortar at an enemy truck yields a positive reward of 4, but firing a mortar on a civilian truck yields a negative reward of −4, i.e., a loss. The solution can be calculated from a linear program, with the results indicating that the best choice for the play is to advance rather than fire mortar or do nothing. In example with very large reward matrices, the enhancement technique of subset summing may also be applied. Since there are four scenarios in this example (enemy truck, civilian truck, enemy tank, or friendly tank), there are $2^4=16$ subsets of the four scenarios. One of these subsets considers none of the scenarios, which is impractical. So in practice, there are always $2_P-1$ subsets, where P is the number of columns (available scenarios) in a reward matrix. TABLE was reproduced from the following document: Jordan, J. D. (2007). Updating Optimal Decisions Using Game Theory and Exploring Risk Behavior Through Response Surface Methodology.

TABLE 1

|  | Enemy Truck | Civilian Truck | Enemy Tank | Friendly Tank |
| --- | --- | --- | --- | --- |
| Fire Mortar | 4 | −4 | 5 | −5 |
| Advance | 1 | 4 | 0 | 4 |
| Do Nothing | −1 | 1 | −2 | 1 |

The goal of linear programming is to maximize a function over a set constrained by linear inequalities and the following mathematical equations (3)-(9).

$$\max z = v + 0w_1 + 0w_2 + 0w_3 \tag{3}$$

$$s.t. \ v \leq 4w_1 + 1w_2 + -1w_3 \tag{4}$$

$$v \leq -4w_1 + 4w_2 + 1w_3 \tag{5}$$

$$v \leq 5w_1 + 0w_2 + -2w_3 \tag{6}$$

$$v \leq -5w_1 + 4w_2 + 1w_3 \tag{7}$$

$$\Sigma w_i = 1 \quad (8)$$

$$w_i \geq 0 \; \forall i \quad (9)$$

where z represents the value of the game, or the objective function, v represents the value of the constraints, $w_1$ represents the optimal probability solution for choice 'Fire Mortar', $w_2$ represents the optimal probability solution for choice 'Advance', $w_3$ represents the optimal probability solution for choice 'Do Nothing', and i represents the index of decision choice. Using a simplex algorithm to solve the linear program yields mixed strategy [0.2857, ... 0.7143, 0]. To maximize minimum gain, the player should fire a mortar approximately 29% of the time, advance 71% of the time, and do nothing none of the time.

In scenarios with very large reward matrices, the optional technique of subset summing may be applied. The subset summing algorithm reduces a constrained optimization problem to solving a series of simpler, reduced-dimension constrained optimization problems. Specifically, for a reward matrix consisting of P scenarios (columns), a set of $2^P-1$ new reward matrices are created by incorporating unique subsets of the scenarios. To illustrate the generation of the subsets to be considered, the following mathematical equation (10) shows an example of constraints from the example of TABLE 1 where each row in the equation corresponds to a row in the reward matrix A. Each new reduced reward matrix is formed by multiplying A element-wise by a binary matrix. Each of the $2^P-1$ binary matrices has a unique set of columns which are all-zero. The element-wise multiplication serves to mask out specific scenarios, leaving only specific combinations, or subsets, of the original scenarios to be considered. This operation increases the run time, but may be a necessary trade-off for improved accuracy. This method also ensures that the correct answer is found by computing the proper objective function. If, for example, A represents a reward matrix, then the solution for computing all combinations of rows is:

$$A. * \begin{bmatrix} 1 & 1 & 0 & 1 \\ 1 & 1 & 0 & 1 \\ 1 & 1 & 0 & 1 \end{bmatrix} \quad (3)$$

Figure 21:
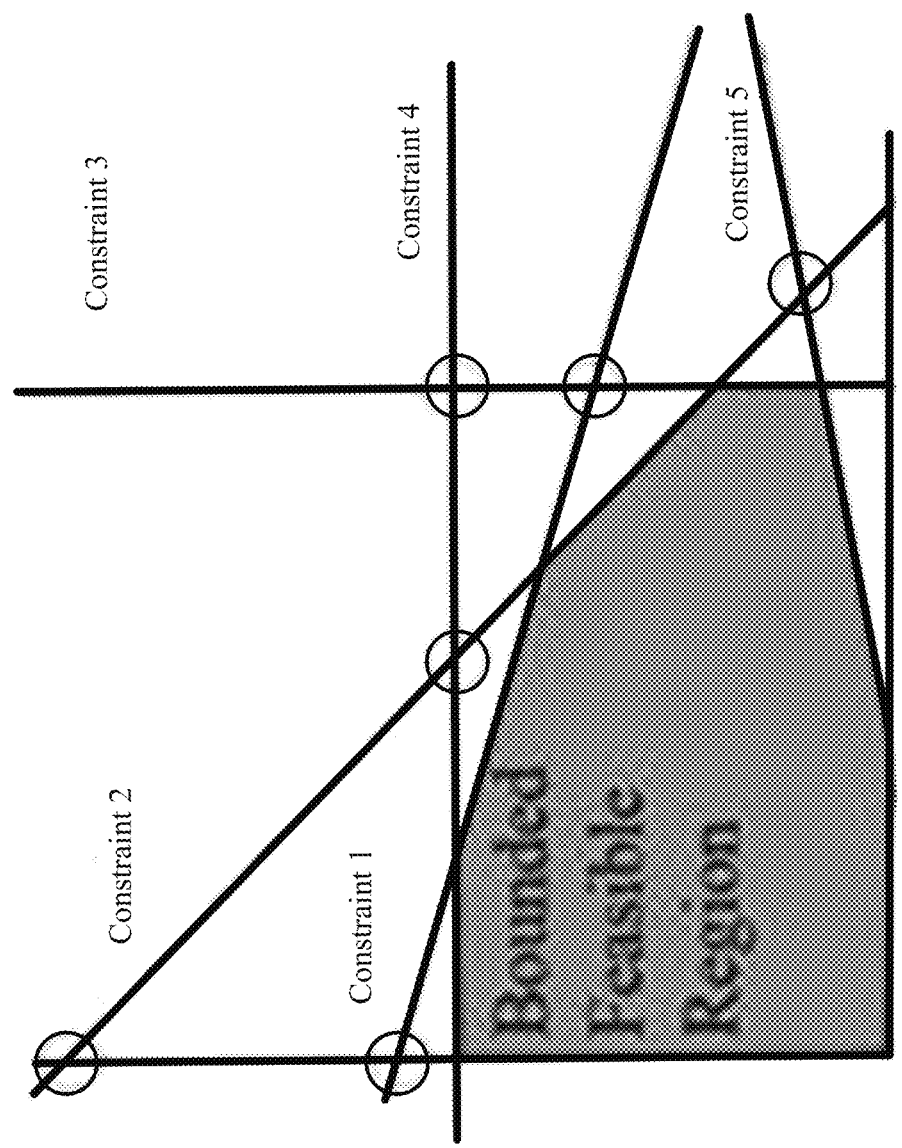
FIG. 21 provides a graph that is useful for understanding game theory.

One reason for running all combinations of decisions, $2^P-1$, where P is the number of rows in a reward matrix, is that one or more constraints eliminate(s) possible feasible solutions, as shown in FIG. 21 with circles. A feasible region is a graphical solution space for the set of all possible points of an optimization problem that satisfy the problem's constraints. Information is treated as parameters rather than constraints, so that a decision can be made outside of traditional feasible regions. This is why the present solution works robustly with complex data for general decision-making applications. Note that FIG. 21 is a simplified representation that could have as many as P dimensions.

Figure 20:
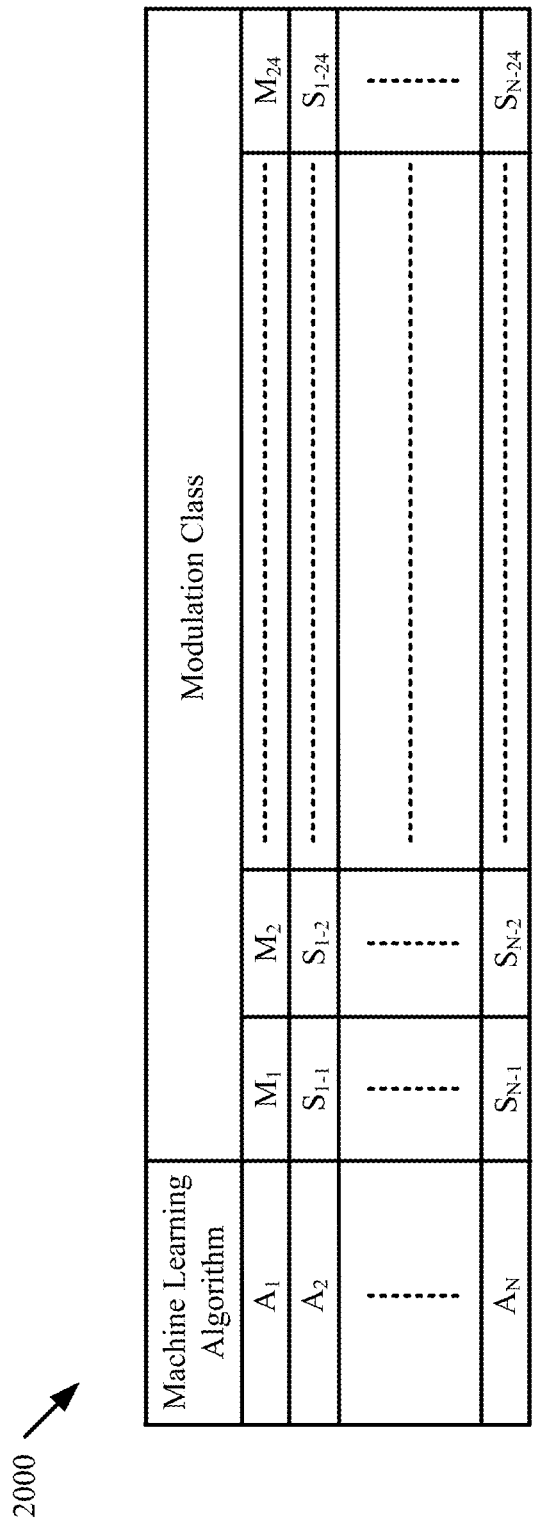
FIG. 20 provides a table that is useful for understanding game theory.

The above TABLE 1 can be modified in accordance with the present solution. For example, as shown in FIG. 20, each row of a table 2000 is associated with a respective machine learning algorithm of a plurality of machine learning algorithms, and each column is associated with a respective modulation class of a plurality of modulation classes. Each cell in the body of the table 2000 includes a likelihood score S. The likelihood scores can include, but are not limited to, goodness-of-fit-predicted scores calculated based on the number of signals and modulation classes. Each goodness-of-fit-predicted score describes how well the machine learned model and modulation class fit a set of observations. A measure of goodness-of-fit summarizes the discrepancy between observed values and the values expected under the machine learned model in question. The goodness-of-fit-predicted score can be determined, for example, using a chi-squared distribution algorithm and/or a likelihood ratio algorithm. The modulation classes can include, but are not limited to, frequency modulation, amplitude modulation, phase modulation, angle modulation, and/or line coding modulation.

The reward matrix illustrated by table 2000 can be constructed in accordance with any known technique and solved by a quantum processor (e.g., quantum processor 106 of FIG. 1). The quantum processor 106 can be implemented in a cognitive sensor (e.g., cognitive sensor 1302 of FIG. 13) of a communications device (e.g., communication device 1102, 1104 or 1108 of FIG. 11).

Figure 22:
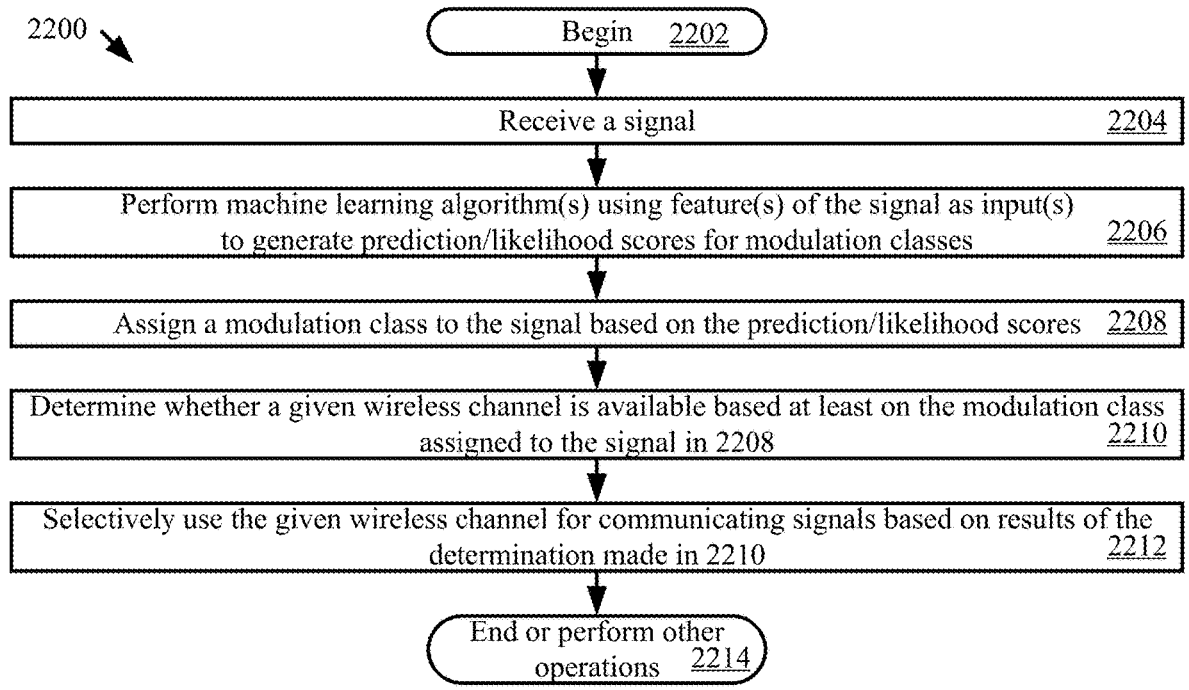
FIG. 22 provides a flow diagram of an illustrative method for determining an availability of channel(s) in a wireless spectrum.

Referring now to FIG. 22, there is provided a flow diagram of an illustrative method 2200 for operating a communication device (e.g., communication device 1102, 1104 or 1108 of FIG. 11). Method 2200 begins with 2202 and continues with 2204 where the communication device receives a signal (e.g., signal 1600 of FIG. 16). In 2206, the communication device performs one or more machine learning algorithms (e.g., neural network(s)) using at least one feature of the signal (e.g., a frequency, phase, amplitude) as an input to generate a plurality of scores (e.g., goodness-of-fit-predicted scores). Each score represents a likelihood that the signal was modulated using a given modulation type of a plurality of different modulation types (e.g., ASK, PSK, QAM, and/or FM). A modulation class is assigned to the signal in 2208 based on the scores. For example, the signal is assigned a modulation class that is associated with the score having the greatest value. Alternatively, the signal is assigned a modulation class that is associated with a score that was selected based on results of an optimization algorithm (e.g., a game theory analysis).

Next in 2210, a determination is made by the communications device as to whether a given wireless channel (e.g., wireless channel 1106 or 1110 of FIG. 11) is available based on the modulation class assigned to the signal, a bit rate, and/or a center frequency of the signal. In some scenarios, a determination is made that the given wireless channel is unavailable when a decision is made that the primary user is not the source of the signal (e.g., based on the modulation class, bit rate of the signal and/or center frequency of the signal). A determination is made that the given wireless channel is unavailable when a decision is made that the primary user is not the source of the signal (e.g., based on the modulation class, bit rate of the signal and/or center frequency of the signal).

The communication device performs operations in 2212 to selectively use the given wireless channel for communicating signals based on results of the determination made in 2210. For example, the given wireless channel is used by a secondary user (e.g., user 1122 of FIG. 11) for communications when a decision is made that the same is available (e.g., when the primary user (e.g., user 1120 of FIG. 11) is not the source of the signal thereby indicating that the primary user is not using the same). In contrast, the secondary user stops using the given wireless channel for communications when a decision is made that the same is unavailable (e.g., when the primary user is the source of the signal thereby indicating that the primary user is using the same). Subsequently, 2214 is performed where method 2200 ends or other operations are performed (e.g., return to 2204).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a system with a quantum processor, comprising:
   performing the following operations by the quantum processor to determine a modulation type for a communication signal, wherein the modulation type identifies an analog or digital modulation scheme;
   receiving a reward matrix at the quantum processor, the reward matrix comprising a plurality of values that are in a given format and arranged in a plurality of rows and a plurality of columns, wherein the plurality of values comprise identifiers for a plurality of machine learning algorithms and identifiers for a plurality of modulation classes;
   converting, by the quantum processor, the given format of the plurality of values to a qubit format;
   performing, by the quantum processor, subset summing operations to make a plurality of row selections based on different combinations of the values in the qubit format;
   using, by the quantum processor, the plurality of row selections to determine a quantum probability for a selection of each row of the plurality of rows;
   making, by the quantum processor, a decision about the modulation type based on the quantum probabilities; and
   selectively using a communication link for communicating another communication signal based on the decision about the modulation type.

2. The method according to claim 1, wherein each row of the reward matrix has a respective choice associated therewith.

3. The method according to claim 2, wherein the respective choice comprises a respective action of a plurality of actions, a respective task of a plurality of tasks, a respective direction of a plurality of directions, a respective plan of a plurality of plans, a respective grid of a plurality of grids, a respective position of a plurality of positions, a respective acoustic ray trace of a plurality of acoustic ray traces, a respective tag of a plurality of tags, a respective path of a plurality of paths, a respective machine learning algorithm of a plurality of machine learning algorithms, a respective network node of a plurality of network nodes, a respective person of a group, a respective emotion of a plurality of emotions, a respective personality of a plurality of personalities, a respective business opportunity of a plurality of business opportunities, or a respective vehicle of a plurality of vehicles.

4. The method according to claim 1, wherein the subset summing operations are implemented by a plurality of quantum adder circuits and a plurality of quantum comparator circuits.

5. The method according to claim 1, wherein the subset summing operations comprises an operation in which a single value of the reward matrix is considered and which results in a selection of the row of the reward matrix in which the single value resides.

6. The method according to claim 1, wherein the subset summing operations comprise an operation in which at least two values of the reward matrix are considered and which results in a selection of the row of the reward matrix in which a largest value of the at least two values resides.

7. The method according to claim 1, wherein the subset summing operations comprise an operation in which a single negative value of the reward matrix is considered and which results in a selection of the row of the reward matrix which is different than the row of the reward matrix in which the single negative value resides.

8. The method according to claim 1, wherein the subset summing operations comprise an operation in which a plurality of values in at least two columns and at least two rows are considered, and which results in a selection of the row of the reward matrix associated with a largest value of the plurality of values in at least two columns and at least two rows.

9. The method according to claim 1, wherein the subset summing operations comprise an operation in which a plurality of values in at least two columns and at least two rows are considered, and which results in a selection of the row of the reward matrix associated with a largest sum of values in the at least two columns.

10. The method according to claim 1, wherein the quantum processor causes the electronic device to transition operational states, change position, change location, change a navigation parameter, perform a particular task, change a resource allocation, use a particular machine learning algorithm to optimize wireless communications, or use a particular object classification scheme or trajectory generation scheme to optimize autonomous driving operations.

11. A quantum processor, comprising:
    a circuit configured to determine a modulation type for a communication signal and control an electronic device, wherein the modulation type identifies an analog or digital modulation scheme:
       receive a reward matrix comprising a plurality of values that are in a given format and arranged in a plurality of rows and a plurality of columns, wherein the plurality of values comprise identifiers for a plurality of machine learning algorithms and identifiers for a plurality of modulation classes;
       convert the given format of the plurality of values to a qubit format;
       perform subset summing operations to make a plurality of row selections based on different combinations of the values in the qubit format;
       use the plurality of row selections to determine a quantum probability for a selection of each row of the plurality of rows;
       make a decision about the modulation type based on the quantum probabilities; and
    control operations of the electronic device to use a communication link for communicating another communication signal based on the decision about the modulation type.

12. The quantum processor according to claim 11, wherein each row of the reward matrix has a respective choice associated therewith.

13. The quantum processor according to claim 12, wherein the respective choice comprises a respective action of a plurality of actions, a respective task of a plurality of tasks, a respective direction of a plurality of directions, a respective plan of a plurality of plans, a respective grid of a plurality of grids, a respective position of a plurality of positions, a respective acoustic ray trace of a plurality of acoustic ray traces, a respective tag of a plurality of tags, a respective path of a plurality of paths, a respective machine learning algorithm of a plurality of machine learning algorithms, a respective network node of a plurality of network nodes, a respective person of a group, a respective emotion of a plurality of emotions, a respective personality of a plurality of personalities, a respective business opportunity of a plurality of business opportunities, or a respective vehicle of a plurality of vehicles.

14. The quantum processor according to claim 11, wherein the subset summing operations are implemented by a plurality of quantum adder circuits and a plurality of quantum comparator circuits.

15. The quantum processor according to claim 11, wherein the subset summing operations comprises an operation in which a single value of the reward matrix is considered and which results in a selection of the row of the reward matrix in which the single value resides.

16. The quantum processor according to claim 11, wherein the subset summing operations comprise an operation in which at least two values of the reward matrix are considered and which results in a selection of the row of the reward matrix in which a largest value of the at least two values resides.

17. The quantum processor according to claim 11, wherein the subset summing operations comprise an operation in which a single negative value of the a plurality of values of the reward matrix is considered and which results in a selection of the row of the reward matrix which is different than the row of the reward matrix in which the single negative value resides.

18. The quantum processor according to claim 11, wherein the subset summing operations comprise an operation in which a plurality of values in at least two columns and at least two rows are considered, and which results in a selection of the row of the reward matrix associated with a largest value of the plurality of values in at least two columns and at least two rows.

19. The quantum processor according to claim 11, wherein the subset summing operations comprise an operation in which a plurality of values in at least two columns and at least two rows are considered, and which results in a selection of the row of the reward matrix associated with a largest sum of values in the at least two columns.

20. The quantum processor according to claim 11, wherein the quantum processor causes the electronic device to transition operational states, change position, change location, change a navigation parameter, perform a particular task, change a resource allocation, use a particular machine learning algorithm to optimize wireless communications, or use a particular object classification scheme or trajectory generation scheme to optimize autonomous driving operations.

* * * * *